(12) United States Patent  
Xiao et al.

(10) Patent No.: US 11,932,570 B2  
(45) Date of Patent: Mar. 19, 2024

(54) CHEMICALLY TOUGHENED GLASS ARTICLE HAVING NO OPTICAL ORANGE SKIN AND METHOD FOR PRODUCING SAME

(71) Applicant: SCHOTT Glass Technologies (Suzhou) Co. Ltd., Suzhou (CN)

(72) Inventors: Wei Xiao, Shanghai (CN); Ning Da, Jiangsu (CN); Feng He, Jiangsu (CN); José Zimmer, Eppstein (DE)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 0 days.

(21) Appl. No.: 17/129,721

(22) Filed: Dec. 21, 2020

(65) Prior Publication Data

US 2021/0107827 A1    Apr. 15, 2021

Related U.S. Application Data

(63) Continuation of application No. PCT/CN2019/092028, filed on Jun. 20, 2019, and a
(Continued)

(51) Int. Cl.  
*C03C 21/00* (2006.01)  
*C03C 3/078* (2006.01)  
(Continued)

(52) U.S. Cl.  
CPC ............ *C03C 21/002* (2013.01); *C03C 3/078* (2013.01); *C03C 3/085* (2013.01); *C03C 3/091* (2013.01);  
(Continued)

(58) Field of Classification Search  
CPC .................................................... C03C 21/002  
See application file for complete search history.

(56) References Cited

U.S. PATENT DOCUMENTS

| 3,556,757 A | * | 1/1971 | Kozlowski | ............ C03C 21/002 65/30.13 |
| RE27,921 E | * | 2/1974 | Duthoit | ................. C03C 21/002 65/30.14 |

(Continued)

FOREIGN PATENT DOCUMENTS

| CN | 1792931 | 6/2006 |
| CN | 102092940 | 6/2011 |

(Continued)

OTHER PUBLICATIONS

CN104692636 EPO Machine Translation Performed 12012022. (Year: 2022).*

(Continued)

*Primary Examiner* — Lisa L Herring  
(74) *Attorney, Agent, or Firm* — Ruggiero McAllister & McMahon LLC

(57) ABSTRACT

A method for chemical toughening a thin glass article with a thickness of at most 0.07 mm is provided. The method includes immersing the glass article into a bath of molten salt having a certain toughening temperature for a certain toughening time to form a toughened glass article; lifting the toughened glass article out of the bath of molten salt; post-toughening dwelling the toughened glass article for a certain dwelling time at a dwelling temperature that is higher than a melting point of the bath of molten salt and lower than a transition temperature (Tg) of the toughened glass article; and cooling and cleaning the toughened glass article.

29 Claims, 12 Drawing Sheets

Related U.S. Application Data continuation of application No. PCT/CN2018/092167, filed on Jun. 21, 2018.

(51) Int. Cl.
  *C03C 3/085* (2006.01)
  *C03C 3/091* (2006.01)
  *C03C 3/093* (2006.01)
  *C03C 4/18* (2006.01)

(52) U.S. Cl.
  CPC ............. *C03C 3/093* (2013.01); *C03C 4/18* (2013.01); *C03C 2204/00* (2013.01)

(56) References Cited

U.S. PATENT DOCUMENTS

| | | | |
|---|---|---|---|
| 2005/0284179 A1* | 12/2005 | Isono | C03C 19/00 65/30.14 |
| 2009/0197088 A1 | 8/2009 | Murata | |
| 2013/0202715 A1 | 8/2013 | Wang | |
| 2014/0248495 A1 | 9/2014 | Matsuda | |
| 2015/0030834 A1 | 1/2015 | Morey | |
| 2015/0210588 A1 | 7/2015 | Chang | |
| 2017/0081239 A1 | 3/2017 | Schwall | |
| 2017/0183259 A1 | 6/2017 | Da | |
| 2017/0233287 A1* | 8/2017 | Li | C03C 3/068 428/172 |
| 2018/0002216 A1 | 1/2018 | Ellison | |
| 2019/0152847 A1* | 5/2019 | Allan | C03C 21/002 |
| 2020/0109079 A1* | 4/2020 | Da | C03C 3/085 |

FOREIGN PATENT DOCUMENTS

| | | | | |
|---|---|---|---|---|
| CN | 102167509 | | 8/2011 | |
| CN | 102815860 | | 12/2012 | |
| CN | 103332855 | | 10/2013 | |
| CN | 104692636 | | 6/2015 | |
| CN | 106746603 | | 5/2017 | |
| CN | 106746741 | | 5/2017 | |
| CN | 107074630 | | 8/2017 | |
| CN | 107117810 A * | 9/2017 | ............ C03C 21/002 |
| CN | 107793043 A * | 3/2018 | ............ C03C 21/002 |
| JP | 2004352536 | | 12/2004 | |
| JP | 2004352536 A * | 12/2004 | ............ C03C 21/002 |
| JP | 2012250905 A * | 12/2012 | ............ C03C 21/002 |
| JP | 2013136515 | | 7/2013 | |
| JP | 2015034107 | | 2/2015 | |
| JP | 2015151315 | | 8/2015 | |
| JP | 2016539067 | | 12/2016 | |
| JP | 2017030995 | | 2/2017 | |
| JP | 2017506207 | | 3/2017 | |
| JP | 2018505837 | | 3/2018 | |
| KR | 20100057594 | | 5/2010 | |
| KR | 20130003579 | | 1/2013 | |
| WO | 2013047675 | | 4/2013 | |
| WO | 2014139147 | | 9/2014 | |
| WO | WO-2015080095 A1 * | 6/2015 | ............ C03C 21/002 |
| WO | 2015127583 | | 9/2015 | |
| WO | 2017185354 | | 11/2017 | |

OTHER PUBLICATIONS

WO2015080095 Machine Translation Performed Dec. 2022. (Year: 2022).*

CN107793043 Machine Translation Performed Dec. 2022. (Year: 2022).*

CN107117810 Machine Translation Performed Dec. 2022. (Year: 2022).*

JP2004-352536A Machine Translation Performed Dec. 2022. (Year: 2022).*

JP-2012250905-A EPO Machine Translation Performed May 11, 2023. (Year: 2023).*

International Search Report dated Sep. 18, 2019 for corresponding International Application PCT/CN2019/092028, 4 pages.

Written Opinion of International Searching Authority dated Sep. 18, 2019 for corresponding International Application PCT/CN2019/092028, 5 pages.

International Preliminary Report on Patentability dated Dec. 22, 2020 for corresponding International Application PCT/CN2019/092028, 6 pages.

Wei, "Glass Production Process", Wuhan: Wuhan University of Technology Press, May 2013, ISBN 978-7-5629-4052-4, 8 pages.

* cited by examiner

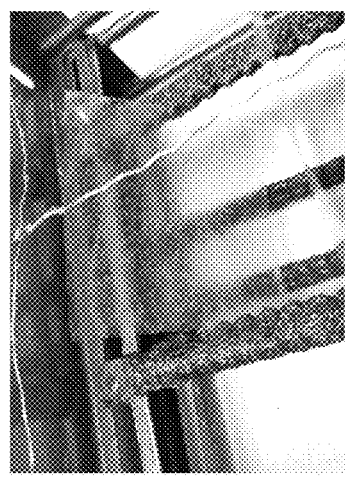
FIG. 3a
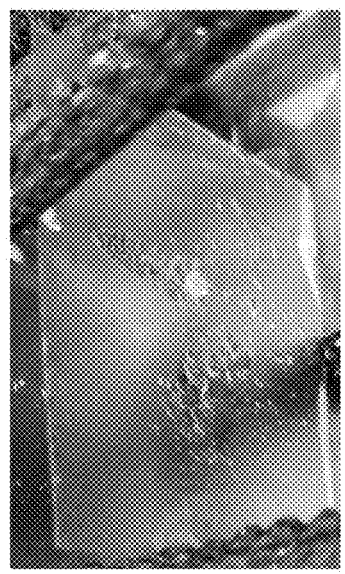
FIG. 4a
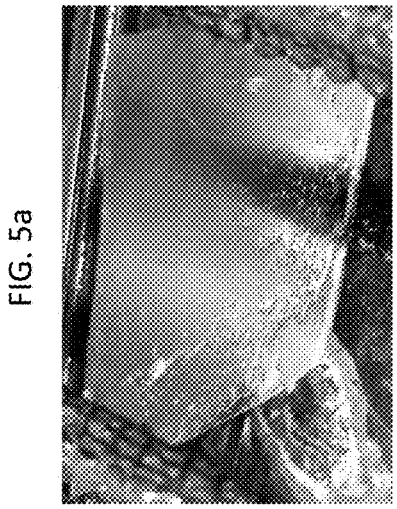
FIG. 5a
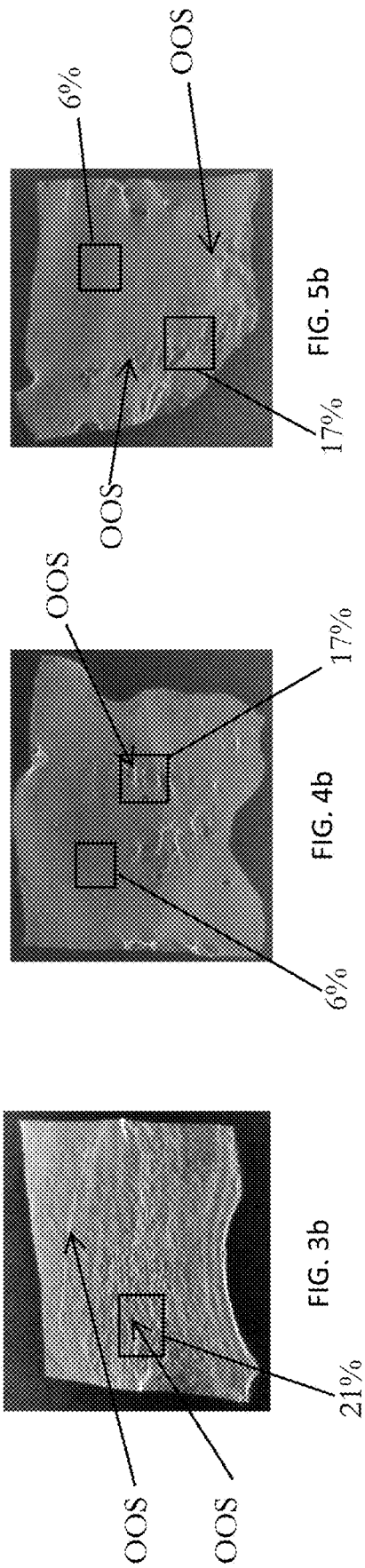
FIG. 3b
FIG. 4b
FIG. 5b

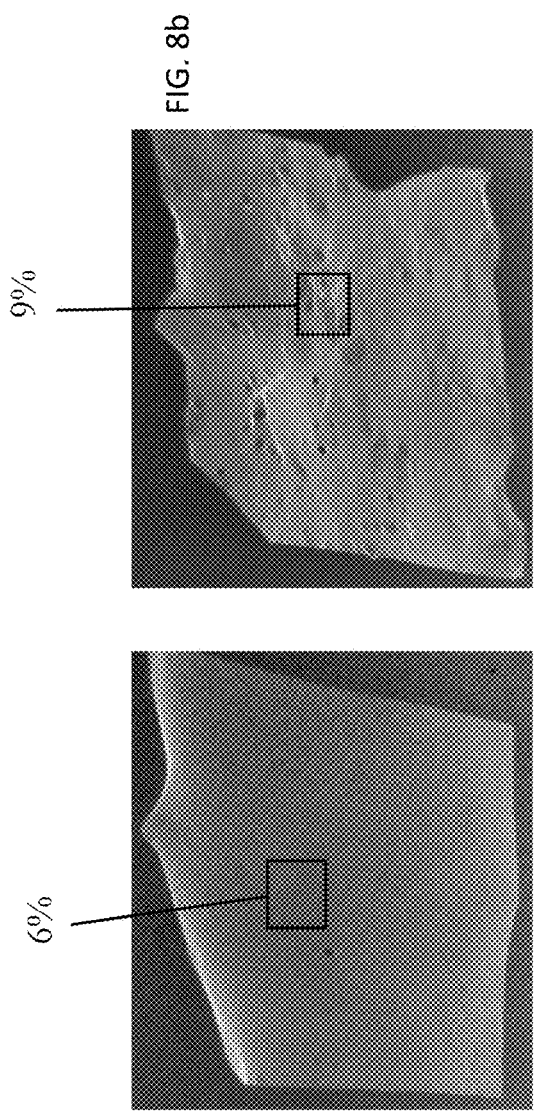
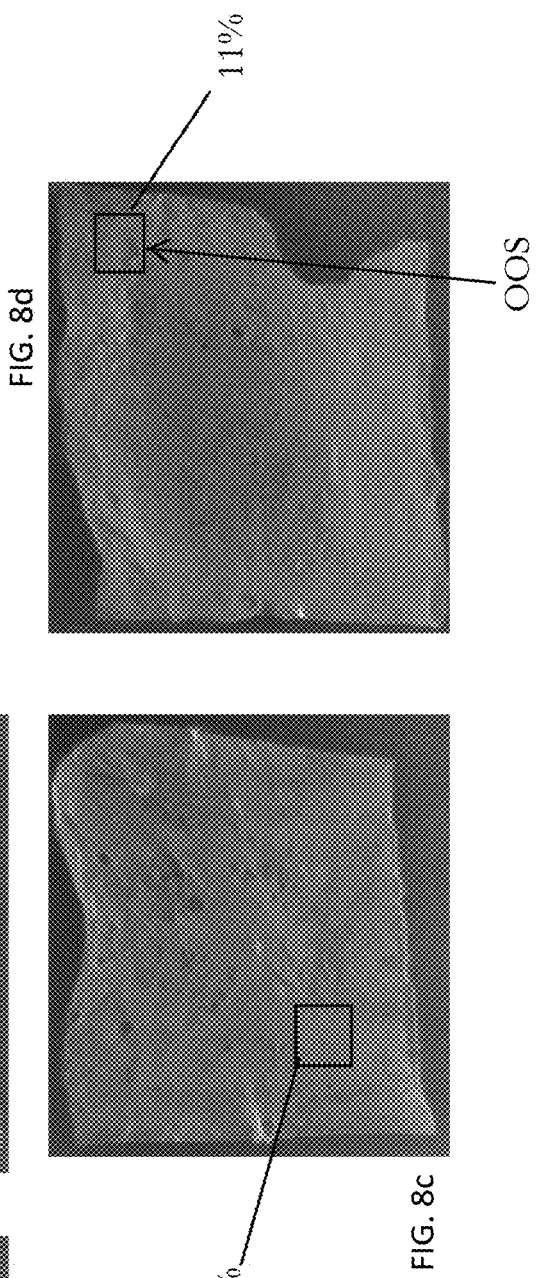
FIG. 8a
FIG. 8b
FIG. 8c
FIG. 8d

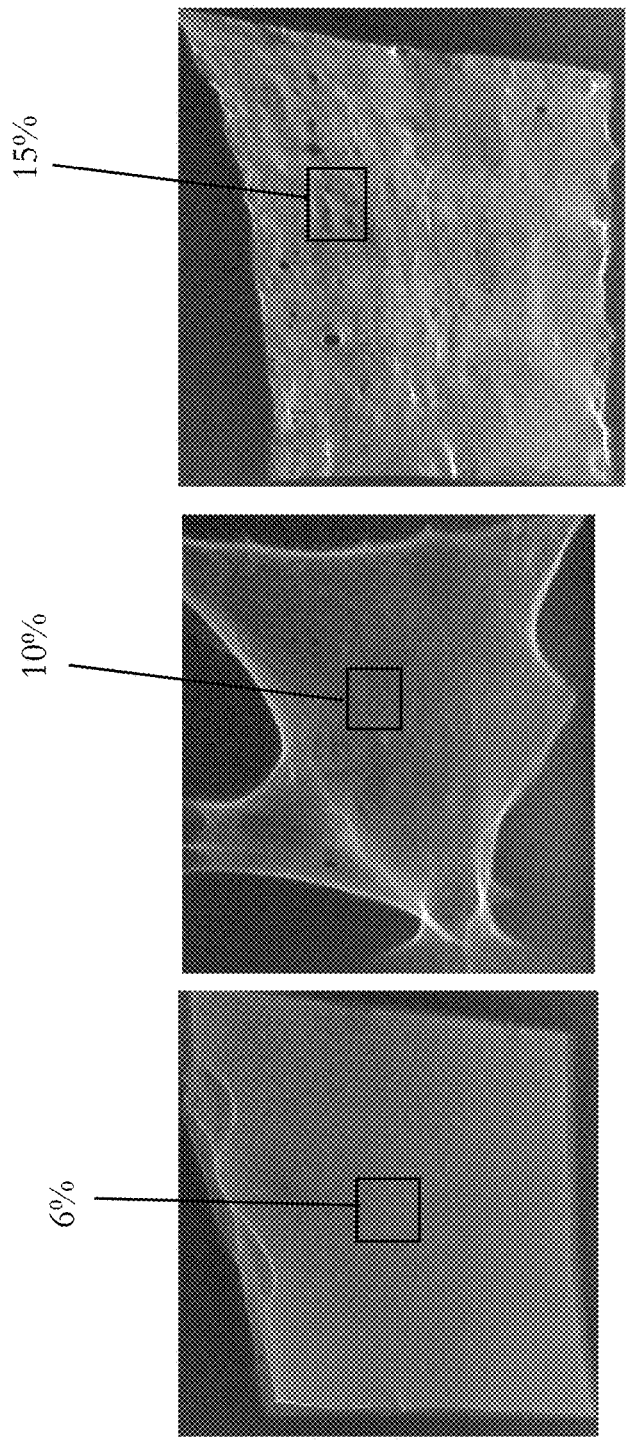

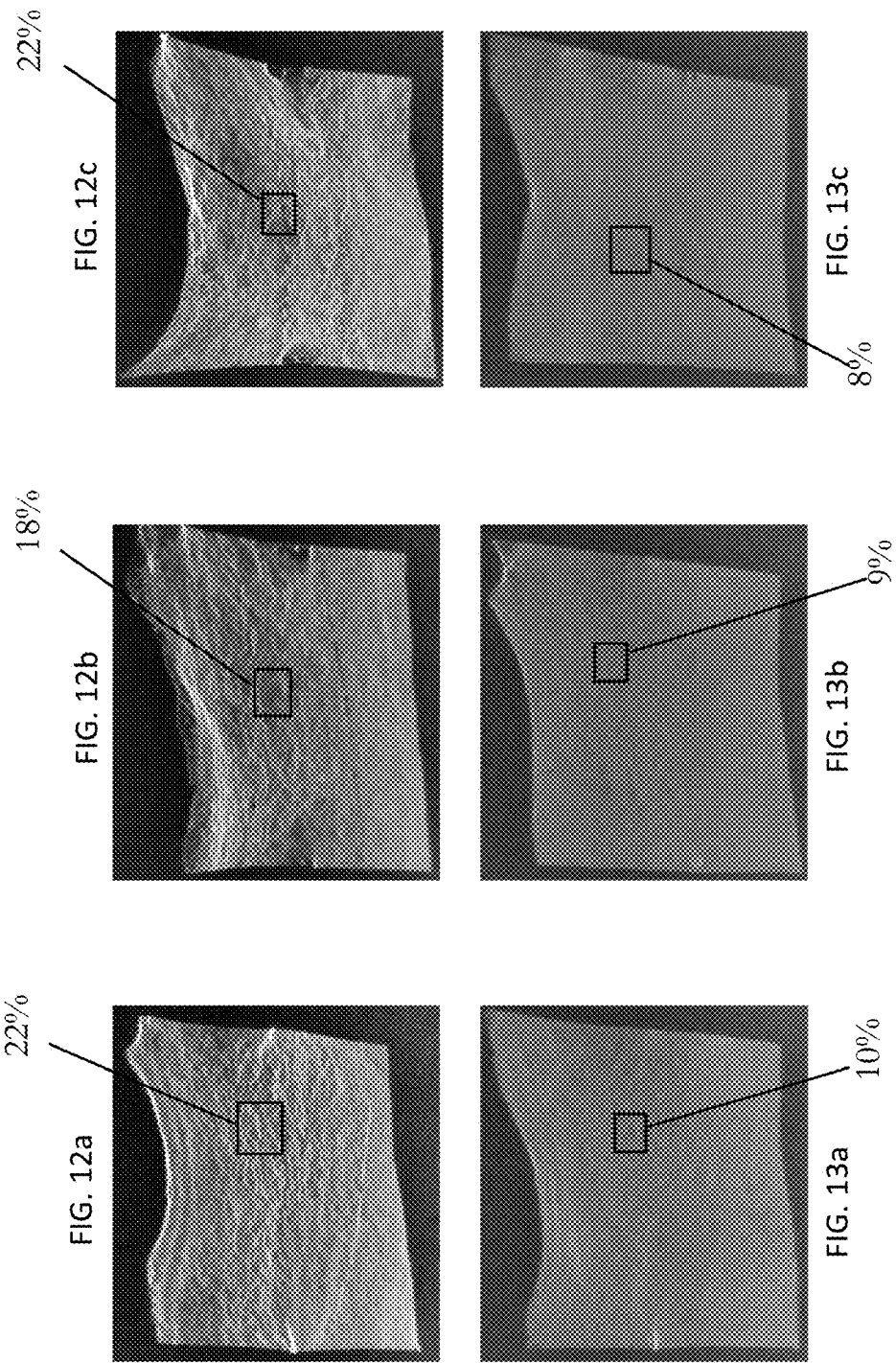

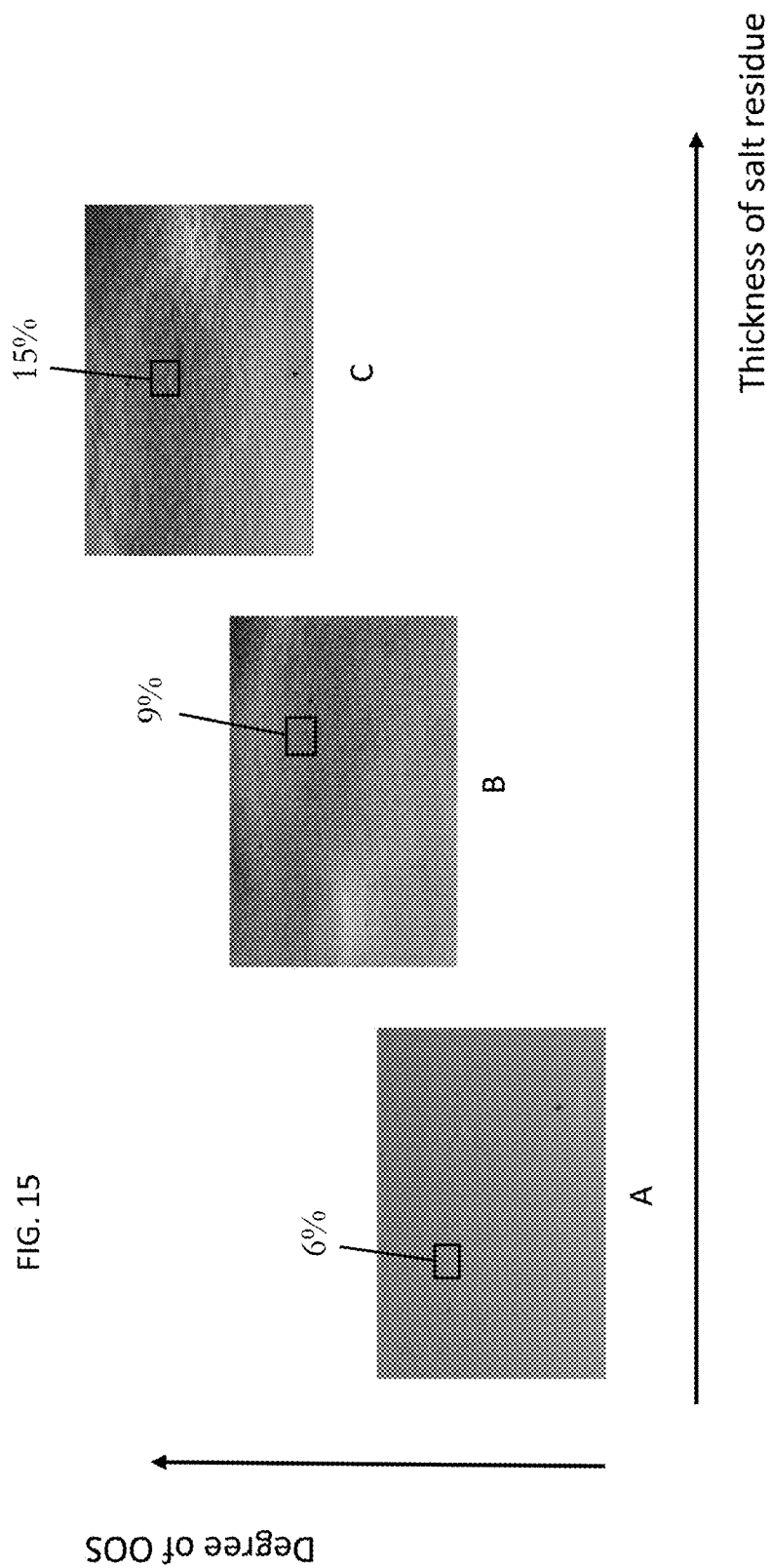

CHEMICALLY TOUGHENED GLASS ARTICLE HAVING NO OPTICAL ORANGE SKIN AND METHOD FOR PRODUCING SAME

CROSS REFERENCE TO RELATED APPLICATION

This application is a continuation of International Application PCT/CN2018/092167 filed on Jun. 21, 2018 and is a continuation of International Application PCT/CN2019/092028 filed on Jun. 20, 2019, the entire contents of both of which are incorporated herein by reference.

BACKGROUND

1. Field of the Invention

The invention relates to a chemically toughened glass article having no optical orange skin when the glass article has a thickness of at most 0.07 mm and is inspected under reflection light and a method for producing such a chemically toughened glass article.

2. Description of Related Art

Thin glasses with different compositions are suitable substrate material for many applications where transparency, high chemical and thermal resistance, and defined chemical and physical properties are important. For example, alkaline free glasses can be used for display panels and as electronic packaging materials in wafer format. The alkaline contained silicate glasses are used for filter coating substrate, touch sensor substrate, and fingerprint sensor module cover.

Aluminosilicate (AS), lithium aluminosilicate (LAS), borosilicate and soda-lime glasses are widely used for applications such as covers for finger print sensor (FPS), protection cover, and display cover. In these applications, the glasses usually will be chemically toughened to achieve a high mechanical strength, as determined by special tests, e.g. 2-point bending (2PB), ball drop, pen drop, sharp impact resistance, sharp contact resistance anti-scratch and others.

In present times, the continuous demand for new functionality of product and wider area of applications call for glass substrates and cover glasses even thinner and lighter with high strength and flexibility. Suitable glasses are ultrathin glasses (UTG). The fields in which ultrathin glass (UTG) is typically applied are protective cover of fine electronics, e.g. UTG can be used as a flexible and foldable display glass for consumer electronics and so on. At the present time, the increasing demands for new functionalities of products and exploiting new and broad applications call for thinner and lighter glass substrates with new properties such as flexibility. Due to the flexibility of UTG such glasses have been searched and developed as cover glasses and displays for devices such as for example smartphones, tablets, watches and other wearables. Such a glass can also be used as a cover glass of a finger print sensor module and as camera lens cover.

However, some of the mechanical properties and performances of the pure glass (for example impact resistance and bendability) are not satisfying because of the very low thickness of UTG. One efficient approach to increase the mechanical performance is chemical toughening, i.e. modifying the surface by ion exchange.

Chemical toughening is a well known process for glass to increase strength of glass like soda lime glass or aluminosilicate (AS) glass or lithium aluminosilicate (LAS) or borosilicate glass that is used as cover glass for display applications, for example. In this circumstance, the surface compressive stresses (CS) are typically between 100 and 1,000 MPa and the depth of the ion-exchange layer depends on the glass thickness.

However, if glass sheet gets thinner than 0.5 mm, handling will get more and more difficult mainly due to defects such as cracks and chippings at the glass edges which lead to breakage. Also, the overall mechanical strength i.e. reflected in bending strength or impact strength will be significantly reduced. As a result, strengthening of the glasses is extremely important for thin glasses. However, for ultrathin glass strengthening is always accompanied by the risk of self breakage due to high central tensile stress of glass.

Typically, <0.4 mm thick flat ultrathin glasses can be produced by direct hot-forming methods such as down draw, overflow fusion or special float procedures. Redraw methods are also possible. Compared with post-treated thin glass by chemical or physical method (e.g. produced via grinding and polishing), the direct hot-formed thin glass has much better surface uniformity and surface roughness because the surfaces are cooled down from high temperature melting state to room temperature. Down-drawn method could be used to produce glass thinner than 0.3 mm or even 0.07 mm, such as aluminosilicate glasses, lithium aluminosilicate glasses, alkali borosilicate glasses, soda lime glasses or alkaline free aluminoborosilicate glasses.

Chemical toughening of UTG has been described (e.g. WO 2014/139147 A1).

For chemical toughening a glass article is placed in a special bath of at least one molten salt having a predetermined temperature for a defined time. During toughening, an ion exchange takes place at the surface of the glass article wherein smaller cations (especially monovalent cations) are replaced by cations having a larger radius. After the toughening process, the glass article is lifted out of the salt bath, subsequently cooled and cleaned.

Surprisingly it was found that a standard ion exchange procedure can lead to an unwanted optical feature appearing at the surface of the toughened glass article in the form of an "optical orange skin" (OOS). This effect can be observed when the glass article has a thickness of equal to or less than 0.07 mm and is inspected under reflection light.

Under such reflective conditions or sometimes even under inspection with the naked eye the surface of the glass article seems to have small irregularities (dents and bumps) like the peel of an orange fruit.

OOS is unwanted because it can disturb the optical appearance of electronic devices using glass articles having such a surface effect.

SUMMARY

The purpose of the invention is to provide a chemically toughened glass article having no optical orange skin when the glass article has a thickness of at most 0.07 mm and is inspected under reflection light and a method for producing a chemically toughened glass article having no visible optical orange skin when the glass article has a thickness of at most 0.07 mm and is inspected under reflection light.

Explanation of Technical Terms

Glass article: The glass article can be of any size. For example it can be a long ultrathin glass ribbon that is rolled (glass roll) or a single smaller glass part cut out off a glass roll or a separate glass sheet or a single small glass article (like a FPS or display cover glass) etc.

Ultrathin glass: In the purpose of this invention ultrathin glass is a flexible, preferred foldable glass with a thickness of equal to or less than 0.4 mm, preferred of equal to or less than 0.14 mm, especially more preferred of equal to or less than 0.1 mm, preferably equal to or less than 0.07 mm, preferably equal to or less than 0.05 mm, preferably equal to or less than 0.03 mm.

Thickness (t): The thickness of a glass article is the arithmetic average of the thickness of the sample to be measured.

Compressive Stress (CS): The induced compression among glass network after ion-exchange on the surface layer of glass. Such compression cannot be released by deformation of glass and sustained as stress. Commercially available test machine such as FSM6000 (company "Luceo Co., Ltd.", Japan, Tokyo) can measure the CS by waveguide mechanism.

Depth of Layer (DoL): The thickness of ion-exchanged layer, a region of glass where CS exists. Commercially available test machine such as FSM6000 (company "Luceo Co., Ltd.", Japan, Tokyo) can measure the DoL by waveguide mechanism.

Central Tension (CT): When CS is induced on one side or both sides of single glass sheet, to balance the stress according to the 3rd principle of Newton's law, a tension stress must be induced in the center region of glass, and it is called central tension. CT can be calculated from measured CS and DoL.

Average roughness (Ra): A measure of the texture of a surface. It is quantified by the vertical deviations of a real surface from its ideal form. Commonly amplitude parameters characterize the surface based on the vertical deviations of the roughness profile from the mean line. Ra is arithmetic average of the absolute values of these vertical deviations.

Total thickness variation (TTV): the largest variation in thickness of a substrate, a coating or a salt residue layer. The Total thickness variation is generally determined by measuring the glass article, sheet or layer in about 20-200 points in a cross pattern (not too close to the edge of the article) and calculating the maximum measured difference in thickness, i.e. TTV=Tmax−Tmin.

BRIEF DESCRIPTION OF THE DRAWINGS

FIGS. 3a, 4a, and 5a show pictures of three pieces of toughened AS glass after having been lifted out of the toughening salt bath containing $KNO_3$;

FIGS. 3b, 4b, and 5b show reflection images of the same samples after cleaning inspected under reflection light;

FIGS. 8a to 8d show the influence of increasing Na-ion content in the $KNO_3$ bath on the OOS effect under reflection light inspection of toughened glass articles of the same composition;

FIG. 10a is a reflection image of an untoughened glass article after slimming down;

FIG. 10b shows the article from FIG. 10a under reflection light inspection after chemical toughening;

FIG. 10c shows an unslimmed down article as in FIG. 10a under reflection light inspection after chemical toughening;

FIG. 11c shows a reflection image of the annealed and toughened glass article of FIG. 11a;

FIGS. 12a, 12b, and 12c show three samples of glass articles just after chemical toughening under reflection light;

FIGS. 13a, 13b, and 13c show the same samples as FIGS. 12a, 12b, and 12c, respectively, under reflection light 7 days later;

FIG. 15 shows the influence of the salt residue thickness attached to the surfaces of the toughened glass article on the degree of OOS.

DETAILED DESCRIPTION

Figure 6:
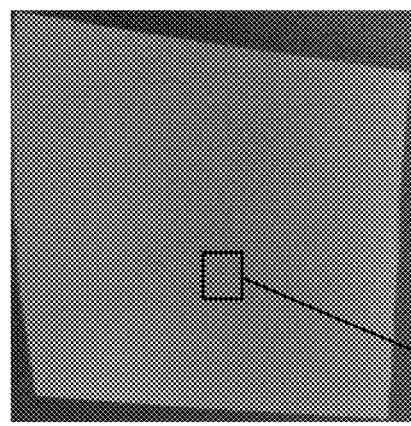
FIG. 6 shows a reflection image of another toughened glass article.

According to the invention a method for producing a chemically toughened glass article having no visible optical orange skin (OOS) when the glass article has a thickness of at most 0.07 mm and is inspected under reflection light provides a more uniform ion exchange process by providing a controlled thickness and distribution of salt residue on the glass surface.

In the prior art is has been assumed that only toughening time, temperature and kind of salt bath have the main impacts/influences on the performances of the toughened glass article. However, chemical toughening of UTG articles is more difficult. Surprisingly the inventors have found that, when ultrathin glass articles are addressed, it is important to control and precisely set the late respectively post ion exchange processes when the toughened glass is lifted out of the salt bath before the salt residue gets solid.

The OOS effect (see FIG. 1b in comparison to FIG. 1a) can be seen on chemically toughened glass articles having a thickness of less than 0.07 mm under reflection light inspection. In this examination method, a strong white light source is used, for example the white light source of a striae inspection system. In the context of this invention a 500W Xenon Lamp (CHF-XM-500W) was used. The sample of the glass article to be inspected is orientated in relation to the light source in such a way that it acts as a mirror, and the light reflected by the glass article is projected on an inspection surface (for example a screen, level and plane wall etc.). The distance between the glass article and the inspection surface should be about 10 cm. Optical and geometrical distortion of the glass article (e.g. warp, deformation, optical effects such as OOS) will become visible in a largely magnified way by this examination method. In the context of the invention, the projected image is visually inspected and documented by taking pictures of the reflection image. In addition, the reflection image pictures can be further evaluated using a computer based image evaluation system (e.g. evaluating different grey levels and/or brightness variations). A suitable image evaluation program is "ImageJ".

Looking at reflection images of a toughened thin glass article having a thickness of 70 μm or less, little surface irregularities can be seen (FIG. 1b, 3b, 4b, 5b) which are designated as optical orange skin (OOS). OOS can appear in different ways: Sometimes the surface seems to have ripple or crimpy structures (FIG. 1b, 3b), sometimes the surface seems to have (local) structures in the form of bumps and dents (FIG. 4b, 5b). Thin thickness of glass can make the OOS effect visible even by naked eye for some toughened glass articles.

The inventors have found that the surface irregularities of toughened UTG visible under reflection light called OOS do not correspond to changes in topology of the surface. Surface topology analysis does not indicate height changes in the frequency as the feature size of OOS (see FIGS. 2a and 2b).

It is assumed that OOS is an optical effect which seems to be caused by inhomogeneity in ion-exchange which may result in certain refractive index gradient inhomogeneity. In the context of the invention, the inventors have found that visible OOS can be correlated to a non-uniform ion exchange process between the glass and the salt residue attached to the glass surface during lifting and after having lifted the glass article out of the salt bath before the salt residue gets solid. Because of gravity and rheology of the molten salt, the thickness of the salt residue attached to the glass surface is not uniform. If toughened in the same salt bath, thicker residual salt leads to worse optical surface appearance called OOS (see FIG. 3a, 3b and FIG. 4a, 4b).

In addition it was found out by the inventors that toughened thin glasses articles having a thickness of more than 70 μm, having the same composition and having been toughened under the same toughening conditions as explained in the description of the Figures below do not show OOS under a corresponding reflection light inspection (see FIG. 6).

In order to avoid or minimize OOS the following procedures are suggested using a described method alone or in combination with other described measures:

According to one aspect of the invention, the method for chemical toughening a thin glass article with a thickness of at most 0.07 mm comprises the following steps: immersing the glass article into a bath of molten salt having a certain toughening temperature for a certain toughening time, lifting the toughened glass article out of the salt bath, post-toughening dwelling the toughened glass article for a certain dwelling time, wherein a dwelling temperature is selected to be higher than the melting point of the salt bath and lower than the transition temperature (Tg) of the toughened glass article, cooling and cleaning the toughened glass article.

During lifting the toughened glass article out of the salt bath the temperature of the space above the salt bath is kept at a high temperature being higher than the melting point of the salt bath. Preferably, the space temperature corresponds to or is near at the dwelling temperature of the subsequent post-toughening dwelling step. In an advantageous variant of the invention, the sections of the toughened glass emerging from the salt melt during the lifting process are not allowed to cool down below the defined dwelling temperature. In a preferred embodiment, the post-toughening dwelling process occurs directly above the salt bath. Alternatively, the lifted toughened glass article is transported to the dwelling place wherein the lifted glass article is kept at the high temperature, preferably corresponding to or being near at the defined dwelling temperature.

The post-toughening dwelling step is preferably performed using a heating furnace wherein the dwelling temperature can be set. According to the invention, the glass article is kept at the dwelling temperature directly after leaving the salt bath for a certain dwelling time prior to cooling down and cleaning it. Because of the higher dwelling temperature (compared to procedures in which the toughened glass article can directly cool down after having left the salt bath) the viscosity of the salt residues sticking to the surfaces of the toughened glass articles is kept at a lower level so that the salt residues move under the influence of gravity and a thin, preferably uniform, layer of residual salt is formed on the surfaces of the toughened glass article. Under reflection light inspection such a toughened glass article having a thickness of equal to or less than 70 μm has no OOS.

In the context of the invention, the lifting time is the time required to lift the glass article completely out of the salt bath. Lifting time starts when the upper edge of the glass article is emerging from the salt bath and ends when the lower bottom edge has just left the salt bath.

The post-toughening dwelling time starts after the lifting time, i.e. when the lower edge of the glass article has emerged out of the salt bath. The dwelling process is a treatment step which affects the whole glass article after having left the toughening salt bath. During the dwelling time (also called holding time) preferably the whole glass article is kept at a temperature which is higher than the melting point of the salt bath.

Preferably the dwelling time is >0 s, preferably >5 s, preferably >15 s, preferably >30 s, preferably >1 min, >preferably ≥2 min. Preferably the dwelling time is longer than the lifting time.

The dwelling time ends when the glass article is finally allowed to cool down below a temperature corresponding to the melting point of the salt bath.

The most used salt for chemical toughening is $Na^+$-contained or $K^+$-contained melted salt or mixture of them. The commonly used salts are $NaNO_3$, $KNO_3$, $NaCl$, $KCl$, $K_2SO_4$, $Na_2SO_4$, $Na_2CO_3$, and $K_2CO_3$. Additives like NaOH, KOH and other sodium salt or potassium salt could be also used for better controlling the speed of ion-exchange, CS and DoL during chemical toughening.

Preferable the toughening temperature of the toughening bath is in the range of 340° C. to 460° C. Further preferably the toughening time is in the range of 1 min to 600 min. Toughening time, toughening temperature and kind of used molten salt bath have to be selected considering the glass type of the article to be toughened and intended toughening results. Preferably the toughened glass article has a CS in the range 100 MPa to 2000 MPa. Preferably the toughened glass article has a DoL which is between 1 μm and t/3 μm, preferably between 2 μm and t/4 μm, preferably between 3 μm and t/5 μm, wherein t is the thickness of the toughened glass article given in μm.

In an advantageous variant of the method, the toughened glass article is lifted from the salt bath with a lifting speed which is <10 m/min, preferably <5 m/min, more preferably <1 m/min, preferably <0.8 m/min, more preferably <0.6 m/min, also preferably <0.5 m/min. If a reduced lifting speed is applied there is sufficient time for the residual salt sticking to the surfaces of the toughened glass article to flow off the surface under the influence of gravity and surface tension of the salt bath and the glass. A small lifting speed helps to form a thinner layer of residual salt on the surfaces of the toughened glass article. It can be advisable to modify the lifting settings during the lifetime of a used salt bath because increasing impurities in the salt bath (e.g. exchanged ions which originates from the glass composition) change the rheology (e.g. viscosity) of the salt bath. If the viscosity raises, a smaller lifting speed shall be applied in order to decrease unwanted residual salt on the surfaces of the toughened glass article.

In the context of the invention, the lifting speed is given as an average speed. It may be advantageous for the result if the glass article is lifted with an essentially constant lifting speed, i.e. the lifting speed is essential not varied during the lifting process.

In advantageous variant the lifting speed is >0.001 m/min, preferably >0.005 m/min, preferably >0.01 m/min, preferably >0.03 m/min, preferably >0.05 m/min.

For providing a toughened glass article having no visible OOS it is advantageous when the difference between the post-toughening dwelling temperature and the toughening temperature is <200° C., preferably <100° C. The difference can also be selected to be <70° C. or <55° C. or <40° C. or <20° C. or <10° C., wherein the given difference values are absolute values, i.e. the dwelling temperature can be higher or lower than the toughening temperature It can be advisable to modify the applied temperature difference during lifetime of a used salt bath because impurities in the salt bath (e.g. exchanged ions which originates from the glass composition) change the rheology (e.g. viscosity) of the salt bath. If the viscosity raises, a higher temperature difference (absolute value) can be applied in order to reduce unwanted residual salt on the surfaces of the toughened glass article.

In an advantageous variant of the invention, the post-toughening dwelling temperature is >350° C., preferably >360° C., preferably >370° C., preferably >380° C., preferably >390° C., preferably >400° C., preferably >410° C., preferably >420° C. The dwelling temperature is chosen to be significantly higher than the melting point of the salt. The inventors have found that dwelling temperatures close to the melting point of the used salt of the toughening bath can lead to toughened glass articles having visible OOS. Without being bound to the following attempt of explanation the reason for this may be that a lower dwelling temperature close to the melting point of the salt could lead to larger variations of the ion mobility so that the ion exchange during dwelling is more non-uniform.

For providing a toughened glass article having no visible OOS it is further advantageous when the post-toughening dwelling time is <120 min, preferably <80 min, preferably <40 min, preferably <20 min, preferably <10 min, preferably 5 min. If the dwelling time is too long, this can lead to a decrease of CS due to relaxation. It can be advisable to modify the applied dwelling time during lifetime of a used salt bath because impurities in the salt bath (e.g. exchanged ions which originates from the glass composition) change the rheology (e.g. viscosity) of the salt bath. If the viscosity raises, a longer dwelling time can be applied in order to reduce unwanted residual salt on the surfaces of the toughened glass article.

In a further advantageous variant the toughening settings, lifting settings and/or post-toughening dwelling settings are selected in such a way that the thickness of salt residue attached to one surface of the toughened glass article is <9/10*t (i.e. <9/10 multiplied by t), preferably <7/10*t, preferably <5/10*t, preferably <3/10*t, preferably <1/10*t, wherein t is the thickness of the glass article. Thus the sum of salt residues for both sides (surfaces) of the plate-like glass article is <18/10*t, preferably <14/10*t, preferably <10/10*t, preferably <6/10*t, preferably <2/10*t.

In another advantageous embodiment, the homogeneity of the salt residue on the glass surface is set. Preferably the TTV (total thickness variation) of the salt residue attached to one surface of the toughened glass article is <9/10*t (i.e. <9/10 multiplied by t), preferably <7/10*t, preferably <5/10*t, preferably <3/10*t, preferably <1/10*t, wherein t is the thickness of the plate-like glass article. A homogeneous thickness (small TTV) of the layer of salt residue on one surface, preferably of both surfaces, of the glass article is advantageous for providing an OOS free toughened glass article.

In another advantageous variant the method comprises the step of controlling a content of impurities in the salt bath (mole concentration of single valent ions) to be <5000 ppm, preferably <3000 ppm, preferably <2000 ppm, preferably <1000 ppm, preferably <700 ppm, preferably <500 ppm, preferably <400 ppm, preferably <300 ppm, preferably <200 ppm, preferably <100 ppm, preferably <50 ppm, preferably <20 ppm. By this measure the rheology of the molten salt bath can be improved which is described in more detail below.

As described above post-toughening dwelling at higher temperatures is an important and preferred measure in order to produce a toughened thin glass article having no OOS. However, an OOS free or OOS reduced glass article can also be generated without a post-toughening dwelling step as described now. Of course, the methods described below can be used alone or in any combination. In addition, the methods described below can also be combined and improved by advantageous measures (dwelling step, lifting speed, thickness of residual salt etc.) having already been described above.

It is important to control the speed applied when the glass article is lifted out of the toughening salt bath. According to a first advantageous measure, the lifting speed of a holder carrying the glass article during toughening is equal to or smaller than 0.5 m/min. The inventors have found that morphology and thickness of the salt residue at the surface of a toughened glass article can be significantly affected by the lifting speed. A slower lifting speed significantly reduces the amount of salt residue attached to the glass surfaces by shear thinning because the surface tension forces changes (see FIGS. 7a and 7b). Thus an efficient method to limit the non-uniform ion exchange process is to reduce the amount of salt residue attached to the glass during lifting.

Further, it is advisable to control the rheology of the molten salt bath. According to a second advantageous measure, the rheology of the molten salt bath is controlled by limiting the content of impurities in the salt bath (counted by mole concentration). Especially the content of impurity of single valent metal ions should be controlled to be less than 5000 ppm, preferably less than 3000 ppm, preferably less than 2000 ppm, preferably less than 1000 ppm, preferably less than 700 ppm, preferably less than 500 ppm, preferably less than 400 ppm, preferably less than 300 ppm, preferably less than 200 ppm, preferably less than 100 ppm, preferably less than 50 ppm, preferably less than 20 ppm. The inventors have found that impurities, such as sodium, in the toughening salt bath can change the rheology of the molten salt and thus can influence the morphology of the salt residue attached to the glass surface after lifting it out of the salt bath (see FIG. 7c in comparison with FIG. 7b). For example, sodium can lower the melting point of the salt because the sodium nitrate/potassium nitrate system has a eutectic point. It is assumed that an increasing content of Na-ions in the KNO₃ salt bath resulting from the ion exchange Na-ions versus K-ions during chemical toughening of the glass article modifies rheology of the molten salt bath and thus of the morphology of the resulting salt residues on the glass surface. An increasing Na-ion content in the salt bath leads to an increasing visible OOS of the toughened glass article (see FIG. 8a-8d).

Thus, an advantageous measure in order to reduce OOS is to reduce sodium content in the KNO₃ salt bath in mass production.

For controlling and reducing the content of sodium in the KNO₃ containing toughening bath special zeolites can preferably be applied as a selective absorber for sodium ions in the salt bath during production.

According to a further advantageous measure, an annealing step prior to chemical toughening can be performed in order to reduce OOS. This measure is described in detail later in connection with FIGS. 11a, 11b and 11c.

According to a further advantageous measure, storing the toughened glass articles prior to reflection light inspection and further proceeding can be performed in order to reduce visible OOS. This measure is described in detail later in connection with FIG. 12a, 12b, 12c and FIG. 13a, 13b, 13c.

According to a further advantageous measure, laminating the toughened glass articles with a transparent medium can be performed in order to reduce visible OOS. This measure is described in detail later in connection with FIGS. 14a and 14b.

To achieve a OOS free or OOS reduced toughened glass article, the molten salt should have a low viscosity (i.e. at least one measure should be adopted selected from the group consisting of choosing a higher salt bath temperature, choosing a higher post-toughening dwelling temperature and lowering the impurity content). In addition the molten salt should be provided with sufficient time for its flow under gravity (i.e. a slower lifting speed and/or a longer post-toughening dwelling time should be used) to form a thin layer on the glass, which is preferably uniform. As mentioned above, the toughening and lifting settings are more restricted for salt bath with higher impurities content.

According to another aspect of the invention the above-indicated problem is solved by a chemically toughened glass article with a thickness of at most 0.07 mm having no optical orange skin (OOS) when the glass article is inspected under reflection light using a strong white light source. The measuring procedure has already been described above. No OOS means that reflection image of the toughened glass article has a low grey level variation or low brightness variation.

In an advantageous embodiment of the invention the toughened glass article has a grey level variation, defined as StdDev/Mean×100%, of ≤9%, preferably ≤8%, preferably ≤7%, preferably ≤6%, preferably ≤5%. The grey level variation is a measure of the degree of optical orange skin (OOS). StdDev/Mean×100% can be determined using an image processing program, for example "ImageJ".

For evaluation, e.g. via "ImageJ", a reflection image of the glass article is created using the method as described above. A photograph of the reflection image is taken wherein the photo should have a resolution of at least 500 pixels per inch of the sample. The photo is cropped so that only the reflection from the glass is within the region of interest, i.e. edge regions, fingerprints, reflection from other objects are to be excluded. Furthermore, the measurements are done at areas which are flat and have no distinguishable warp and/or deformation. Without further adjustments, the photo should have a mean grey value of 80-100 (measured by ImageJ).

Then the standard deviation (StdDev) of the grey value of the photo is determined. The StdDev is calculated from all individual pixels in the photo. The grey level variation is calculated as StdDev/mean multiplied by 100%.

It is advantageous to determine the degree optical orange skin at different surface locations on the toughened glass article. Preferably the toughened glass article has a high homogeneity concerning the degree of optical orange skin. Preferably the whole measureable surface (i.e. without edge regions, regions with fingerprints and/or reflections from other objects, regions with distinguishable warp and/or deformation etc.) has a grey level variation which is <9%, preferably <8%, preferably <7%, preferably <6%, preferably <5%.

The ultrathin glass article according to the invention has a thickness of equal to or less than 70 μm, more preferably less than or equal to 65 μm, more preferably less than or equal to 60 μm, more preferably less than or equal to 55 μm, further preferably less than or equal to 50 μm, more preferably less than or equal to 45 μm, more preferably less than or equal to 40 μm, more preferably less than or equal to 35 μm, further preferably less than or equal to 30 μm, more preferably less than or equal to 25 μm, more preferably less than or equal to 20 μm, even preferably less than or equal to 10 μm. Such particularly thin glass articles are desired for various applications as described above. In particular, the thin thickness grants the glass flexibility. The thickness can be at least 5 μm.

The surface compressive stress (CS) of the glass article according to the invention is at least 100 MPa. Preferably CS is higher than 200 MPa, more preferably higher than 300 MPa, more preferably higher than 400 MPa, more preferably higher than 500 MPa, more preferably higher than 600 MPa. According to preferred embodiments of the invention CS is equal to or more preferably higher than 700 MPa, more preferably higher than 800 MPa, more preferably higher than 900 MPa, further preferably higher than 1000 MPa. However, CS should not be very high because the glass may otherwise be susceptible to self-breakage. Preferably, CS is equal to or lower than 2000 MPa, preferably equal to or lower than 1600 MPa, advantageously equal to or lower than 1500 MPa, more preferably equal to or lower than 1400 MPa. Some advantageous variants even have a CS of equal to or lower than 1300 MPa or equal to or lower than 1200 MPa.

Preferably the toughened glass article has a depth of layer (DoL) which is between 1 μm and t/3 μm, preferably between 2 μm and t/4 μm, preferably between 3 μm and t/5 μm, wherein t is the thickness of the toughened glass article given in μm.

To reach good chemical toughening performance, the glass should content fair amount of alkaline metal ions, preferably $Na_2O$, furthermore, adding less amount $K_2O$ to glass composition can also improve chemical toughening rate. Furthermore, it is found that adding $Al_2O_3$ to glass composition can significantly improve the toughening performance of glass.

$SiO_2$ is the major glass network former in the glasses of the present invention. Additionally, also $Al_2O_3$, $B_2O_3$ and $P_2O_5$ may be used as glass network formers. The content of the sum of $SiO_2$, $B_2O_3$ and $P_2O_5$ should not be less than 40% for common production method. Otherwise, the glass sheet may be difficult to form and could become brittle and loose transparency. A high $SiO_2$ content will require high melting and working temperature of glass production, usually it should be less than 90%. In preferred embodiments, the content of $SiO_2$ in the glass is between 40 and 75 wt.-%, more preferred between 50 and 70 wt.-%, even more preferably between 55 and 68 wt.-%. In other preferred embodiments, the content of $SiO_2$ in the glass is between 55 and 69 wt.-%, more preferred between 57 and 66 wt.-%, even more preferably between 57 and 63 wt.-%. In a further preferred embodiment, the content of $SiO_2$ in the glass is between 60 and 85 wt.-%, more preferred between 63 and 84 wt.-%, even more preferably between 63 and 83 wt.-%. In another further preferred embodiment, the content of $SiO_2$ in the glass is between 40 and 81 wt.-%, more preferred between 50 and 81 wt.-%, even more preferably between 55 and 76 wt.-%. Adding the $B_2O_3$ and $P_2O_5$ to $SiO_2$ could modify the network property and reduce the melting and working temperature of glass. Also, the glass network former has big influence on the CTE of glass.

In addition, the $B_2O_3$ in the glass network forms two different polyhedron structures which are more adaptable to loading force from outside. Addition of $B_2O_3$ can usually result in lower thermal expansion and lower Young's modulus which in turn leads to good thermal shock resistance and slower chemical toughening speed through which low CS and low DoL could be easily obtained. Therefore, the addition of $B_2O_3$ to ultrathin glass could greatly improve the chemical toughening processing window of ultrathin glass and widen the practical application of chemically toughened ultrathin glass. In preferred embodiments, the amount of $B_2O_3$ in the glass of the invention is between 0 and 20 wt.-%, more preferably between 0 and 18 wt.-%, more preferably between 0 and 15 wt.-%. In some embodiments the amount of $B_2O_3$ can be between 0 and 5 wt.-%, preferably between 0 and 2 wt.-%. In another embodiment the amount of $B_2O_3$ can be between 5 and 20 wt. %, preferably between 5 and 18 wt.-%. If the amount of $B_2O_3$ is too high, the melting point of the glass may be too high. Moreover, the chemical toughening performance is reduced when the amount of $B_2O_3$ is too high. $B_2O_3$ free variants can be preferred.

$Al_2O_3$ works both as glass network former and glass network modifier. The $[AlO_4]$ tetrahedral and $[AlO_6]$ hexahedral will be formed in the glass network depending on the amount of $Al_2O_3$, and they could adjust the ion-exchanging speed by changing the size of space for ion-exchange inside glass network. Generally, the content of this component varies depending on the respective glass type. Therefore, some glasses of the invention preferably comprise $Al_2O_3$ in an amount of at least 2 wt.-%, more preferably in an amount of at least 10 wt.-% or even at least 15 wt.-%. However, if the content of $Al_2O_3$ is too high, the melting temperature and working temperature of glass will also be very high and the crystalline will easily formed to make glass loose the transparency and flexibility. Therefore, some glasses of the invention preferably comprise $Al_2O_3$ in an amount of at most 30 wt.-%, more preferably at most 27 wt.-%, more preferably at most 25 wt.-%. Some advantageous embodiments can comprise $Al_2O_3$ in an amount of at most 20 wt.-%, preferably of at most 15 wt.-% or of at most 10 wt.-%, or even preferably at most 8 wt. %, preferably at most 7 wt. %, preferably at most 6 wt. %, preferably at most 5 wt. %. Some glass variants can be free of $Al_2O_3$. Other advantageous glass variants can comprise at least 15 wt. %, preferably at least 18 wt. % $Al_2O_3$ and/or at most 25 wt. %, preferably at most 23 wt. %, more preferably at most 22 wt. % $Al_2O_3$.

Alkaline oxides like $K_2O$, $Na_2O$ and $Li_2O$ work as the glass work modifier. They can break glass network and form non-bridge oxide inside glass network. Adding alkaline could reduce the working temperature of glass and increase CTE of glass. Sodium and lithium content is important for ultrathin flexible glass which is chemical toughenable, for $Na^+/Li^+$, $Na^+/K^+$, $Li^+/K^+$ ion exchange is a necessary step for the toughening, the glass will not be toughened if it does not contain alkaline itself. However, sodium is preferred over lithium because lithium may significantly reduce the diffusivity of the glass. Therefore, some glasses of the invention preferably comprise $Li_2O$ in an amount of at most 7 wt. %, preferably at most 5 wt. %, more preferably at most 4 wt. %, more preferably at most 2 wt. %, more preferably at most 1 wt. %, more preferably at most 0.1 wt. %. Some preferred embodiments are even free of $Li_2O$. Depending on the glass type a lower limit for $Li_2O$ can be 3 wt. %, preferably 3.5 wt. %.

The glasses of the invention preferably comprise $Na_2O$ in an amount of at least 4 wt. %, more preferably at least 5 wt. %, more preferably at least 6 wt. %, more preferably at least 8 wt. %, more preferably at least 10 wt. %. Sodium is very important for the chemical toughening performance as the chemical toughening preferably comprises the ion exchange of sodium in the glass with potassium in the chemical toughening medium. However, the content of sodium should also not be too high because the glass network may be severely deteriorated and glass may be extremely hard to be formed. Another important factor is that ultrathin glass should have low CTE, to meet such requirement glass should not contain too much $Na_2O$. Therefore, the glasses preferably comprises $Na_2O$ in an amount of at most 30 wt. %, more preferred at most 28 wt. %, more preferred at most 27 wt. %, more preferred at most 25 wt. %, more preferred at most 20 wt. %.

The glasses of the invention may comprise $K_2O$. However, as the glasses are preferably chemically toughened by exchanging sodium ions in the glass with potassium ions in the chemical toughening medium, a too high amount of $K_2O$ in the glass will compromise the chemical toughening performance. Therefore, the glasses of the invention preferably comprise $K_2O$ in an amount of at most 10 wt. %, more preferred at most 8 wt. %. Some preferred embodiments comprises at most 7 wt. %, other preferred embodiments at most 4 wt. %, more preferred at most 2 wt. %, more preferred at most 1 wt. %, more preferred at most 0.1 wt. %. Some preferred embodiments are even free of $K_2O$.

But the total amount of alkaline content should preferably not be higher than 35 wt.-%, preferably not higher than 30 wt. %, more preferably not higher than 28 wt. %, more preferably not higher than 27 wt. %, even preferably not higher than 25 wt. %, for the glass network may be severely deteriorated and glass may be extremely hard to be formed. Some variants comprise an alkaline content of at most 16 wt.-%, preferably of at most 14 wt.-%. Another important factor is that ultrathin glass should have low CTE, to meet such requirement glass should not contain too much alkali elements. However, as described above, the glasses should contain alkali elements in order to facilitate chemical toughening. Therefore, the glasses of the present invention preferably comprise alkali metal oxides in an amount of at least 2 wt. %, more preferred at least 3 wt. %, more preferred at least 4 wt. %, more preferred at least 5 wt. %, more preferred at least 6 wt. %.

Alkaline earth oxides such as MgO, CaO, SrO, BaO work as the network modifier and decrease forming temperature of glass. These oxides can be added to adjust the CTE and Young's modulus of glass. Alkaline earth oxides have very important function that they can change refractive index of glass to meet special requirements. For example, MgO could decrease the refractive index of glass and BaO could increase the refractive index. The weight content of alkaline earth oxides should preferably not be higher than 40 wt. %, preferably not higher than 30 wt.-%, preferably not higher than 25 wt.-%, also preferably not higher than 20 wt.-%, more preferably not higher than 15 wt.-%, more preferably not higher than 13 wt.-%, more preferably not higher than 12 wt.-%. Some variants of glasses can comprise alkaline earth oxides of at most 10 wt.-%, preferably of at most 5 wt.-%, more preferably of at most 4 wt.-%. If the amount of alkaline earth oxides is too high, chemical toughening performance may be deteriorated. A lower limit for alkaline earth oxides can be 1 wt. %, or 5 wt. %. Moreover, the crystallization tendency may be increased if the amount of alkaline earth oxides is too high. Some advantageous variants can be free of alkaline earth oxides.

Some transition metal oxides in glass, such as ZnO and $ZrO_2$, have similar function as alkaline earth oxides and may be comprised in some embodiments. Other transition metal oxides, such as $Nd_2O_3$, $Fe_2O_3$, CoO, NiO, $V_2O_5$, $MnO_2$, $TiO_2$, CuO, $CeO_2$, and $Cr_2O_3$, work as coloring agent to make glass with specific optical or photonic functions, for example, color filter or light convertor. $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The advantageous compositions below refer to different glass types before toughening.

In one embodiment, the ultrathin flexible glass is alkali metal aluminosilicate glass comprising the following components in the indicated amounts (in wt. %):

| Component | (wt. %) |
| --- | --- |
| $SiO_2$ | 40-75 |
| $Al_2O_3$ | 10-30 |
| $B_2O_3$ | 0-20 |
| $Li_2O + Na_2O + K_2O$ | 4-30 |
| MgO + CaO + SrO + BaO + ZnO | 0-15 |
| $TiO_2 + ZrO_2$ | 0-15 |
| $P_2O_5$ | 0-10 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The alkali metal aluminosilicate glass of the invention preferably comprises the following components in the indicated amounts (in wt. %):

| Component | (wt. %) |
| --- | --- |
| $SiO_2$ | 50-70 |
| $Al_2O_3$ | 10-27 |
| $B_2O_3$ | 0-18 |
| $Li_2O + Na_2O + K_2O$ | 5-28 |
| MgO + CaO + SrO + BaO + ZnO | 0-13 |
| $TiO_2 + ZrO_2$ | 0-13 |
| $P_2O_5$ | 0-9 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the alkali metal aluminosilicate glass of the invention comprises the following components in the indicated amounts (in wt. %):

| Components | (wt. %) |
| --- | --- |
| $SiO_2$ | 55-68 |
| $Al_2O_3$ | 10-27 |
| $B_2O_3$ | 0-15 |
| $Li_2O + Na_2O + K_2O$ | 4-27 |
| MgO + CaO + SrO + BaO + ZnO | 0-12 |
| $TiO_2 + ZrO_2$ | 0-10 |
| $P_2O_5$ | 0-8 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In one embodiment, the ultrathin flexible glass is soda lime glass comprising the following components in the indicated amounts (in wt. %):

| Component | (wt. %) |
| --- | --- |
| $SiO_2$ | 40-81 |
| $Al_2O_3$ | 0-10 |
| $B_2O_3$ | 0-5 |
| $Li_2O + Na_2O + K_2O$ | 5-30 |
| MgO + CaO + SrO + BaO + ZnO | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass of this invention preferably comprises the following components in the indicated amounts (in wt. %):

| Component | (wt. %) |
| --- | --- |
| $SiO_2$ | 40-81 |
| $Al_2O_3$ | 0-6 |
| $B_2O_3$ | 0-5 |
| $Li_2O + Na_2O + K_2O$ | 5-30 |
| MgO + CaO + SrO + BaO + ZnO | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass of this invention preferably comprises the following components in the indicated amounts (in wt. %):

| Component | (wt. %) |
| --- | --- |
| $SiO_2$ | 50-81 |
| $Al_2O_3$ | 0-8 |

-continued

| Component | (wt. %) |
|---|---|
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass of this invention preferably comprises the following components in the indicated amounts (in wt. %):

| Component | (wt. %) |
|---|---|
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the soda lime glass of the invention comprises the following components in the indicated amounts (in wt. %):

| Component | (wt. %) |
|---|---|
| $SiO_2$ | 55-76 |
| $Al_2O_3$ | 0-6 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the soda lime glass of the invention comprises the following components in the indicated amounts (in wt. %):

| Component | (wt. %) |
|---|---|
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In one embodiment, the ultrathin flexible glass is lithium aluminosilicate glass comprising the following components in the indicated amounts (in wt. %):

| Component | (wt.-%) |
|---|---|
| $SiO_2$ | 55-69 |
| $Al_2O_3$ | 15-25 |
| $Li_2O$ | 3-7 |
| $Na_2O + K_2O$ | 0-30 |
| $MgO + CaO + SrO + BaO$ | 0-5 |
| ZnO | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The lithium aluminosilicate glass of the invention preferably comprises the following components in the indicated amounts (in wt. %):

| Component | (wt.-%) |
|---|---|
| $SiO_2$ | 57-66 |
| $Al_2O_3$ | 15-23 |
| $Li_2O$ | 3-5 |
| $Na_2O + K_2O$ | 3-25 |
| $MgO + CaO + SrO + BaO$ | 1-4 |
| ZnO | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the lithium aluminosilicate glass of the invention comprises the following components in the indicated amounts (in wt. %):

| Component | (wt.-%) |
| --- | --- |
| $SiO_2$ | 57-63 |
| $Al_2O_3$ | 15-22 |
| $Li_2O$ | 3.5-5 |
| $Na_2O + K_2O$ | 5-20 |
| $MgO + CaO + SrO + BaO$ | 0-5 |
| $ZnO$ | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |
| F | 0-1 |
| $B_2O_3$ | 0-2 |

Optionally, coloring oxides can be added, such as $Nd_2O_3$, $Fe_2O_3$, $CoO$, $NiO$, $V_2O_5$, $MnO_2$, $CuO$, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In one embodiment, the ultrathin flexible glass is borosilicate glass comprising the following components in the indicated amounts (in wt. %):

| Component | (wt.-%) |
| --- | --- |
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Optionally, coloring oxides can be added, such as $Nd_2O_3$, $Fe_2O_3$, $CoO$, $NiO$, $V_2O_5$, $MnO_2$, $CuO$, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The borosilicate glass of the invention preferably comprises the following components in the indicated amounts (in wt. %):

| Component | (wt.-%) |
| --- | --- |
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 |

Optionally, coloring oxides can be added, such as $Nd_2O_3$, $Fe_2O_3$, $CoO$, $NiO$, $V_2O_5$, $MnO_2$, $CuO$, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The borosilicate glass of the invention preferably comprises the following components in the indicated amounts (in wt. %):

| Component | (wt.-%) |
| --- | --- |
| $SiO_2$ | 63-83 |
| $Al_2O_3$ | 0-7 |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 |

Optionally, coloring oxides can be added, such as $Nd_2O_3$, $Fe_2O_3$, $CoO$, $NiO$, $V_2O_5$, $MnO_2$, $CuO$, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Typically, the ultrathin glass according to the invention could be produced by polishing down or etching from thicker glass. These two methods are not economical and lead to bad surface quality which is quantified by Ra roughness for example.

Direct hot-forming production like down draw, overflow fusion method are preferred for the mass production. Redraw method is also advantageous. These mentioned methods are economical and the glass surface quality is high.

Generally, strengthening, as called as toughening, can be done by immersing glass into melt salt bath with potassium ions or cover the glass by potassium ions or other alkaline metal ions contained paste and heated at high temperature at certain time. The alkaline metal ions with larger ion radius in the salt bath or the paste exchange with alkaline metal ions with smaller radius in the glass article, and surface compressive stress is formed due to ion exchange. As described above, immersing the glass article into a bath of molten salt is applied here. After lifting the toughened glass article out of the salt bath and further advantageous steps the glass article is cooled and cleaned using known procedures.

A chemically toughened glass article of the invention is obtained by chemically toughening a chemically toughenable glass article. The toughening process could be done by immersing the ultrathin glass article into a salt bath which contains monovalent ions to exchange with alkali ions inside glass. The monovalent ions in the salt bath has radius larger than alkali ions inside glass. A compressive stress to the glass is built up after ion-exchange due to larger ions squeezing in the glass network. After the ion-exchange, the strength and flexibility of ultrathin glass are surprisingly and significantly improved. In addition, the CS induced by chemical toughening improves the bending properties of the toughened glass article and could increase scratch resistance and impact resistance of glass so that toughened glass would not get scratched easily, and the DoL could increase the scratch tolerance that glass is less likely broken even scratched.

The most used salt for chemical toughening is $Na^+$-contained or $K^+$-contained melted salt or mixture of them. The commonly used salts are $NaNO_3$, $KNO_3$, $NaCl$, $KCl$, $K_2SO_4$, $Na_2SO_4$, $Na_2CO_3$, and $K_2CO_3$. Additives like $NaOH$, $KOH$ and other sodium salt or potassium salt could be also used for better controlling the speed of ion-exchange, CS and DoL during chemical toughening. $Ag^+$-containing or $Cu^{2+}$-containing salt bath could be used to add anti-microbial function to ultrathin glass.

The chemical toughening is not limit to single step. It can include multi steps in salt bath with alkaline metal ions of various concentrations to reach better toughening performance. Thus, the chemically toughened glass article according to the invention can be toughened in one step or in the course of several steps, e.g. two steps.

The chemically toughened glass article according to the invention can have just one surface (first surface) where a compressive stress region extending from the first surface to a first depth in the glass article (DoL) exists, wherein the region is defined by a compressive stress (CS). In this case the glass article comprises only one toughened side. Preferably the glass article according to the invention also comprises a second surface—opposite to the first surface—where a second compressive stress region extending from the second surface to a second depth in the glass article (DoL) exists, the region is defined by a compressive stress (CS). This preferred glass article is toughened on both sides.

CS mostly depends on the composition of glass. Higher content $Al_2O_3$ can be helpful to achieve higher CS. After toughening, the ultrathin glass should have high enough CS to achieve high strength. Therefore, CS is equal to or more than 100 MPa, preferably more than 100 MPa, preferably more than 200 MPa, more preferably more than 300 MPa, also preferably more than 400 MPa, further preferably more than 500 MPa. In especially preferred embodiments, CS is more than 600 MPa, further preferably more than 700 MPa, more preferably more than 800 MPa.

Generally, DoL depends on glass composition, but it can increase nearly infinitely with increased toughening time and toughening temperature. A defined DoL is essential to ensure the stable strength of toughened glass, but too high DoL increases the self-breakage ratio and the strength performance when the ultrathin glass article is under compressive stress, so DoL should be preferably controlled.

In some embodiments, high sharp contact resistance of bare glass is required, and low DoL is preferred. To achieve the defined low DoL the toughening temperature and/or the toughening time is/are reduced. Sometimes a lower toughening temperature may be advisable as DoL is more sensitive to the temperature and a longer toughening time is easily to be set during mass production. However, a reduced toughening time is also possible in order to decrease DoL of the glass article.

The advantageous value of DoL depends in each case on the glass composition, the thickness and applied CS of the respective glass article. In general, glass articles according to the above mentioned advantageous embodiment have a quite low DoL. By decreasing the DoL, the CT decreases. If high impact force and/or press force is applied on such embodiments by sharp objects, the caused defects will just be on the glass surface. Since the CT is reduced significantly the caused defect is not able to overcome the internal strength of the glass article, and thus the glass article does not break into two or several pieces. Such a glass article with low DoL has an improved sharp contact resistance.

As mentioned above CS, DoL and CT depends on the glass composition (glass type), glass thickness and toughening conditions.

The chemically toughened glass articles can be used in the field of cover and substrate for flexible and foldable electronics, like image sensor, display cover, screen protector. In addition it can be used for example in the following application fields of display substrate or protection cover, finger print sensors cover, general sensor substrate or cover, cover glass of consumer electronics, protective covers of displays and other surfaces, especially bended surfaces. Moreover, the glass articles may also be used in the applications of display substrate and cover, fingerprint sensor module substrate or cover, semiconductor package, thin film battery substrate and cover, foldable display. In specific embodiments, the glass articles may be used as cover film for resistance screens, and expendable protective films for display screens, cell phones, cameras, gaming gadget, tablet, laptops, TV, mirror, windows, aviation widows, furniture, and white goods.

The invention is especially suitable for being used in the applications of display substrate and cover, fragile sensors, fingerprint sensor module substrate or cover, semiconductor package, thin film battery substrate and cover, foldable display. Further it can be used in flexible electronic devices providing thin, lightweight and flexible properties (e.g. curved displays, wearable devices). Such flexible devices also requires flexible substrates e.g. for holding or mounting components. In addition flexible displays with high contact resistance and small bending radii are possible.

In one embodiment, the glass is an alkali-containing glass, such as alkali aluminosilicate glass, alkali silicate glass, alkali borosilicate glass, alkali aluminoborosilicate glass, alkali boron glass, alkali germanate glass, alkali borogermanate glass, alkali soda lime glass, and combinations thereof.

These and other aspects of the present invention will be apparent from the following description, accompanying drawings and the appended claims.

Unless indicated otherwise the samples described below are as produced 30 μm AS glass articles having the same composition. "As produced" means that the glass articles were produced via a down draw method. The tested sample size is mostly 50 mm×50 mm. The toughening bath is based on $KNO_3$. For some experiments, $NaNO_3$ salt was successively added to the salt bath in order to simulate the ageing process of the toughening bath. The toughening time was 10 min, the toughening temperature was 420° C. The produced DoL was about 10 μm. The produced CS was in the range 600 to 800 MPa.

Figure 1B:
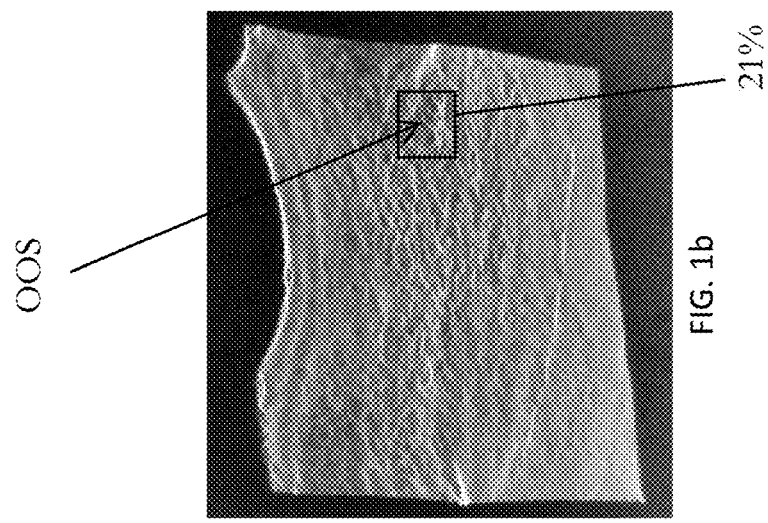
FIG. 1b shows a reflection image of a toughened glass article.
Figure 1A:
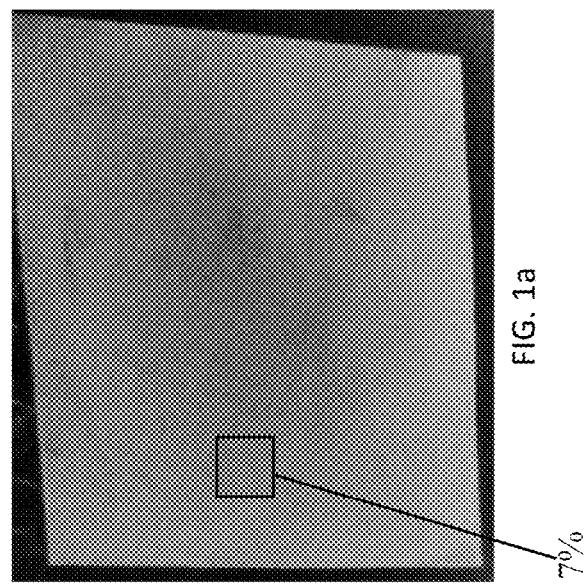
FIG. 1a shows a reflection image of an untoughened glass article.

FIG. 1a shows a reflection image (i.e. a projected image, using the reflection light inspection method as described above) of a plate-like, untoughened 30 μm glass article of a 50 mm×50 mm size consisting of an aluminosilicate glass. A plate-like glass article has two large main surfaces on opposite sides connected by small edges. Under reflection light inspection the surface appears smooth without any irregularities.

FIG. 1b shows a reflection image of a toughened 30 μm glass article of a 50 mm×50 mm size consisting of an aluminosilicate glass. The glass article was toughened in a $KNO_3$ salt bath comprising about 2500 ppm sodium. Using reflection light inspection, one can see a surface with irregularities appearing as ripple or crimpy structures (see arrowhead). This optical appearance is called "optical orange skin" (OOS). The curved upper edge is due to the slight warp of the toughened sample and is not due to breakage of the glass. The inventors have found that the visible surface irregularities of toughened UTG called OOS do not correspond to changes in topology of the surface, rather it is an optical problem.

Figure 2B:
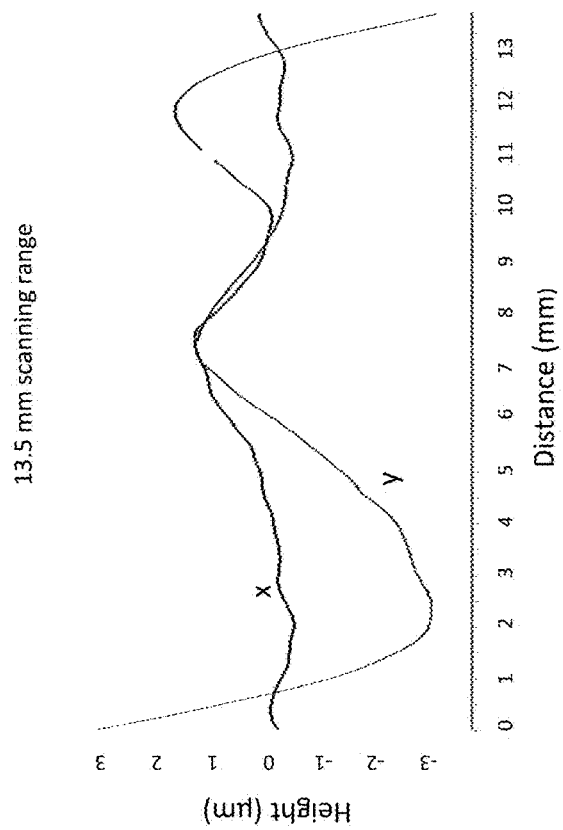
FIG. 2b shows the analysis results of the surface topology using white light interferometry (WLI)
Figure 2A:
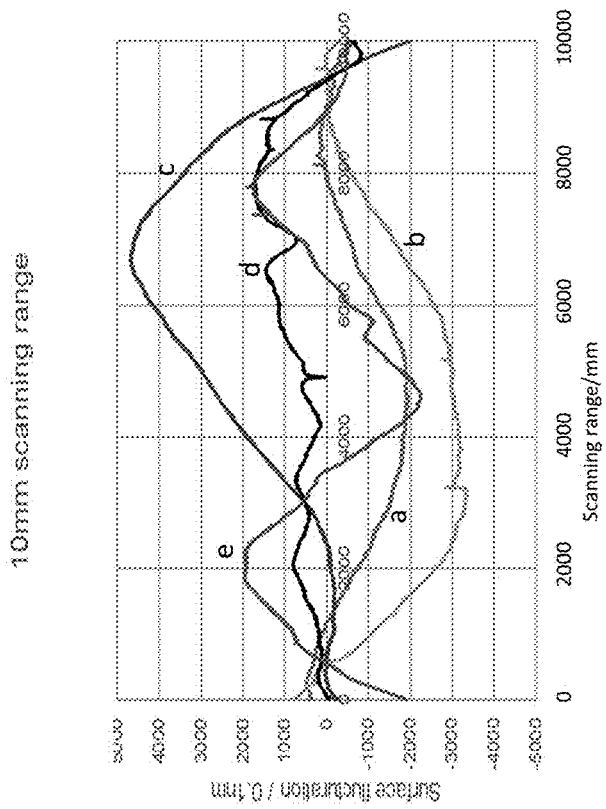
FIG. 2a shows the analysis results of the surface topology using a "Stylus profiler"

FIG. 2a shows the analysis results of the surface topology using a "Stylus profiler". The surface topology of different untoughened AS glass samples a, b, c and toughened AS glass samples d, e were measured. The Stylus profiler indicates surface height variations in the range of 0.5 μm in the scanning range of 10 mm.

FIG. 2b shows the analysis results of the surface topology using white light interferometry (WLI). WLI is a non-contact optical method for surface height measurement on 3-D structures with surface profiles varying between tens of nanometers and a few centimeters. It is often used as an alternative name for coherence scanning interferometry in the context of areal surface topography instrumentation that relies on spectrally-broadband, visible-wavelength light (white light). WLI results of an untoughened AS glass sample x and a toughened AS glass sample y (each having a 30 μm thickness) indicates a surface height variation in the range of 5 μm in the scanning range of 10 mm.

FIGS. 3a, 4a and 5a show pictures of three pieces of toughened 30 μm AS glass after having been lifted out of the toughening salt bath containing $KNO_3$. The three samples have the same glass composition and were toughened under the same toughening conditions. Salt residues can be seen on the surface of the samples. While there are areas on the glass surface having a quite thin and homogeneous salt film there are also sections with higher residual molten salt where ion exchange can proceed for a longer time. This leads to an uneven ion exchange over the glass surface area. FIGS. 3b, 4b and 5b show reflection images of the same samples after cleaning inspected under reflection light. FIG. 3b shows similar OOS structures as FIG. 1b (ripple/crimpy structures, see arrowhead). In FIGS. 4b and 5b, the surface seems to have (local) structures in the form of little bumps and dents (see arrowheads) which are also designated as OOS. As can be seen, the surface irregularities visible under reflection light coincide with the salt residual pattern of the toughened glass articles. Thus, OOS effects are correlated to the distribution of residual salt on the surface of the samples, instead of by raw glass composition.

FIG. 6 shows a reflection image of a toughened 75 μm AS glass article toughened in a $KNO_3$ salt bath with 10000 ppm sodium. Here, no characteristic surface irregularities (OOS) can be observed under reflection light inspection.

Figure 7B:
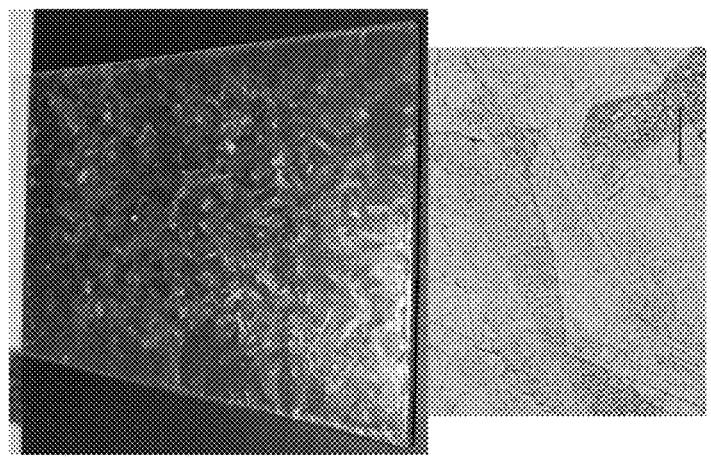
FIGS. 7a, 7b, and 7c show toughened glass articles having been lifted from toughening baths at different speeds.
Figure 7A:
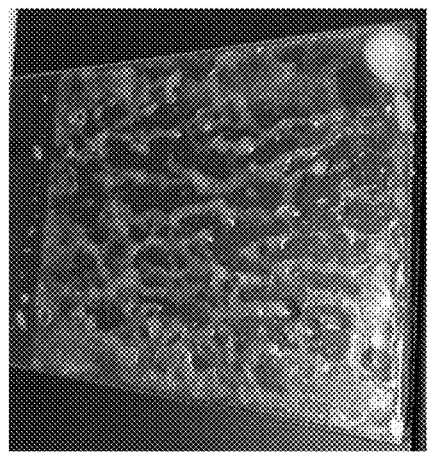

FIG. 7a shows a toughened glass article having been quickly lifted from the toughening bath consisting of pure $KNO_3$. The lifting speed was about 5 cm/s. As a result, thick and unevenly distributed salt residues are sticking to the glass surface. In contrast, FIG. 7b shows a toughened glass article of the same glass composition having been slowly lifted from the toughening bath consisting of pure $KNO_3$. The lifting speed was about 5 mm/s. Here, a more even distribution of salt residue can be observed. When inspected under reflection light such a slowly lifted sample does not show OOS.

Figure 7C:
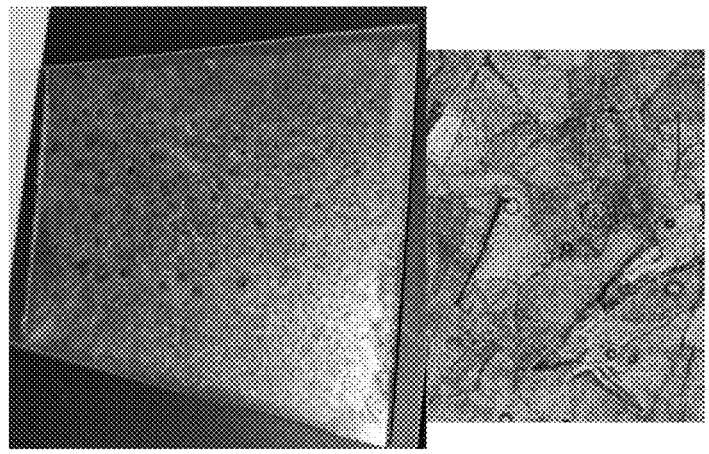

FIG. 7c shows a toughened glass article having been slowly lifted from the toughening bath consisting of $KNO_3$ with 300 ppm sodium. Comparing FIG. 7b and FIG. 7c it can be seen, that impurities such as Na-ions can change the morphology of the salt residue.

FIGS. 8a to 8d show the influence of increasing Na-ion content in the $KNO_3$ bath on the OOS effect under reflection light inspection of 30 μm thick, toughened AS glass articles of the same composition. In order to simulate the increasing Na-ion content in the salt bath during lifetime of the salt bath a Na containing salt (here $NaNO_3$) was added. When a pure fresh $KNO_3$ salt bath is used, no OOS is visible in the reflection image (FIG. 8a). FIG. 8b shows the reflection image for a sample toughened in a fresh $KNO_3$ salt bath containing 100 ppm sodium. FIG. 8c shows the reflection image for a sample toughened in a fresh $KNO_3$ salt bath containing 200 ppm sodium. FIG. 8d shows the reflection image for a sample toughened in a fresh $KNO_3$ salt bath containing 300 ppm sodium. As can be seen, the OOS gets worse with increasing sodium content in the toughening bath. When more sodium is added into the $KNO_3$ bath, the salt residue generated on the toughened glass article increases (for the same lifting and dwelling settings). Thus, the OOS gets worse.

Figure 9C:
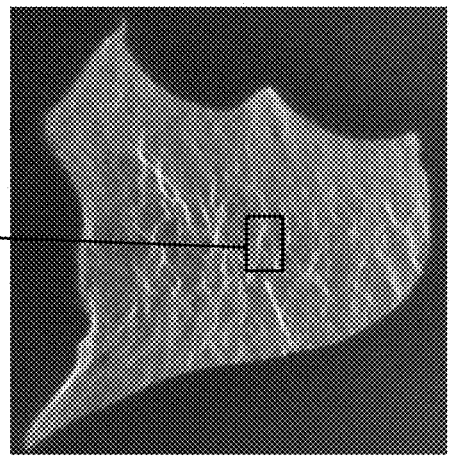
FIGS. 9a to 9c show results of experiments for maintaining sodium impurity content of the salt bath.
Figure 9B:
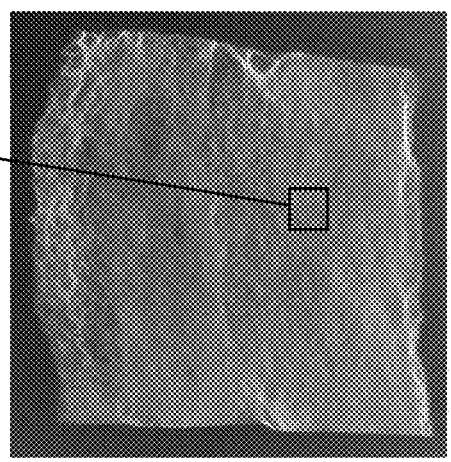
Figure 9A:
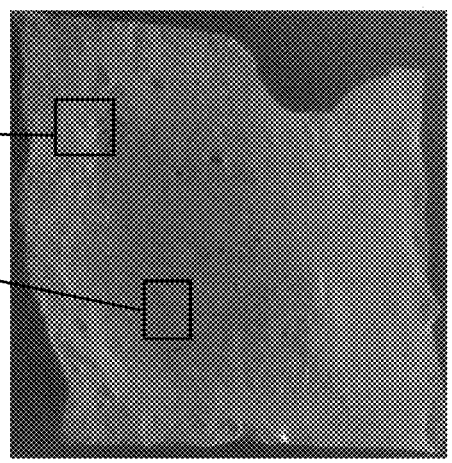

FIGS. 9a to 9c show the results of experiments for maintaining sodium impurity content of the salt bath under a certain level (200 ppm) by means of adding $K_3PO_4$ salt to the $KNO_3$ salt bath comprising 300 ppm sodium in order to limit OOS. FIG. 9a shows a reflection image of a 30 μm thick AS glass article toughened in a $KNO_3$ bath containing 300 ppm. In FIG. 9b (reflection image) 0.5 wt. % $K_3PO_4$ was added to the toughening bath. In FIG. 9c (reflection image) 1 wt. % $K_3PO_4$ was added to the toughening bath. All samples have the same composition, thickness and applied toughening conditions (toughening temperature about 420° C., toughening time about 10 min.). As can be seen adding $K_3PO_4$ into the salt bath was not able to suppress the OOS. On the contrary, this additive seems to promote the OOS.

In FIG. 10a a reflection image of an untoughened 30 μm AS glass article can be seen which was produced via slimming down (etching with an acid) from a 75 μm thick, down drawn glass. It has no OOS. FIG. 10b shows the article from FIG. 10a under reflection light inspection after chemical toughening. The sample shows some OOS. The deformation of the edges of the picture is due to the slightly higher deformation of slimmed glass compared to as produced UTG. For comparison an as produced toughened 30 μm AS glass article having been toughened under the same toughening conditions is shown as reflection image in FIG. 10c. Comparing FIG. 10b and FIG. 10c the OOS effect of slimmed 30 μm toughened glass is less pronounced than that of as produced toughened glass of the same thickness. This may be explained as follows: The outer part of fresh drawn glass ribbon has a higher fictive temperature than the inner part. Thus, slimmed glass should have a denser structure at the surface (higher energy barrier for ion exchange) than down drawn glass. So the ion exchange between the well-slimmed glass and the salt residue is suppressed to some extent. In addition, surface roughness of slimmed glass could change the amount of salt residue due to different contact angle between the glass surface and the molten salt. Rougher surface could hold thicker salt residue.

Figure 11C:
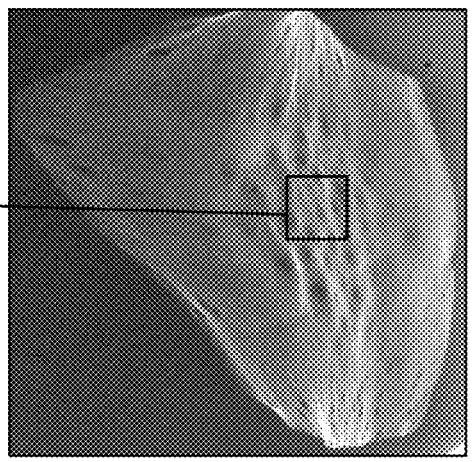
Figure 11B:
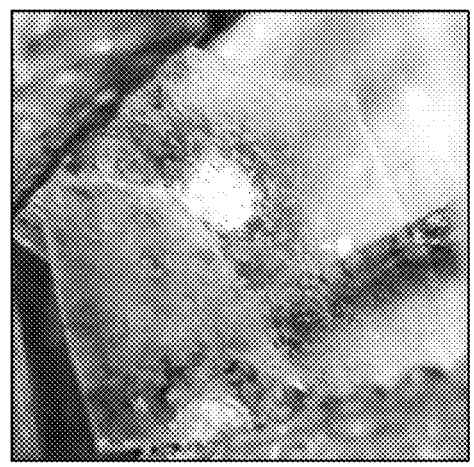
FIG. 11b shows the sample of FIG. 11a after chemical toughening.
Figure 11A:
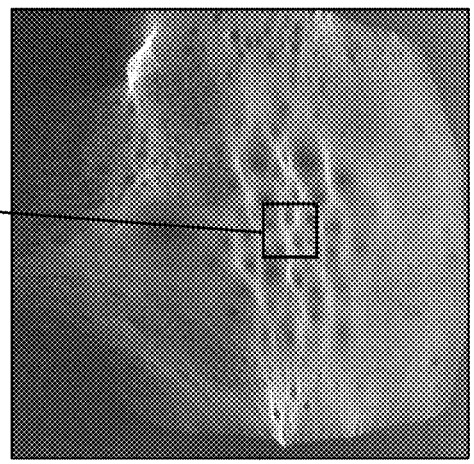
FIG. 11a shows a reflection image of an untoughened glass article after heat treatment.

A further advantageous measure in order to reduce OOS can be to perform an annealing step prior to chemical toughening. Preferably annealing is above Tg of the glass. FIG. 11a shows a reflection image of an untoughened 30 μm AS glass article which has been heated up to 637° C. After a holding time of 1 h the glass article was cooled down using a rate of 1° C./min until a temperature of >567° C. In FIG. 11b the sample of FIG. 11a can be seen after chemical toughening having salt residue on the surface. FIG. 11c shows a reflection image of the annealed and toughened 30 μm AS glass article of FIG. 11a. Additional OOS surface effect cannot be observed on toughened 30 μm glass if it is annealed above Tg before toughening. There are no new features origin from chemical toughening process by inspection either in reflective light or by naked eye. In FIGS. 11a and 11c the uneven features in the reflection light images are caused by slight deformation of the annealed sample.

A further advantageous measure in order to reduce visible OOS can be to store the toughened glass articles prior to reflection light inspection and further proceeding. FIG. 12a, 12b, 12c shows three samples of 30 μm AS glass articles just after chemical toughening under reflection light. The samples show the unwanted OOS effect. The FIG. 13a, 13b, 13c show the same samples under reflection light 7 days later. After one week, the OOS effect clearly gets less pronounced. Thus, a longer storage time reduces the unwanted OOS effect to some extent.

Figure 14B:
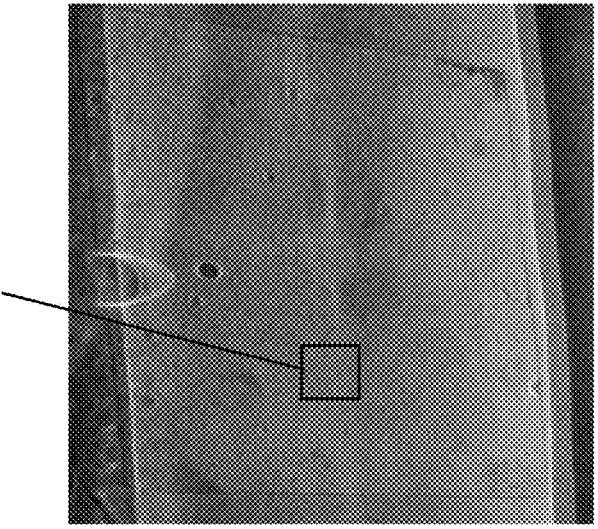
FIGS. 14a and 14b show reflection images of laminated toughened glass articles.
Figure 14A:
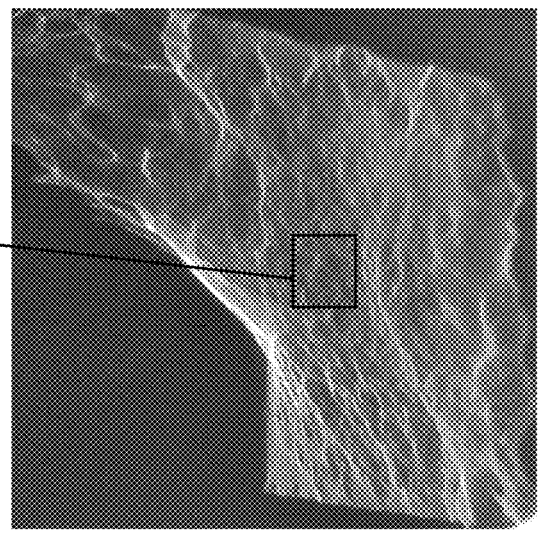

According to a further advantageous measure, laminating the toughened glass articles with a transparent medium can be performed in order to remove visible OOS as can be seen in the reflection images of FIGS. 14a and 14b. FIG. 14a shows the reflection image of a toughened 30 μm AS glass sample. OOS is visible. FIG. 14b shows the same glass article after lamination on a transparent medium (here silicone glue). No OOS is visible here. Lamination on silicone glue removes the reflection light from the bottom side of the toughened glass article. This indicates that OOS is an optical effect. This might be explained as follows without being restricted to this attempted explanation: OOS may be caused by a certain refractive index gradient inhomogeneity caused by ion-exchange of residual salt, a short light path difference between reflective light from top and bottom side of the glass article.

FIG. 15 shows the influence of the salt residue thickness attached to the surfaces of the toughened glass article on the degree of OOS. Here, the thickness of the glass is 32 μm in each case. The total sum of "glass thickness" and "salt thickness" (wherein the latter is the sum of salt thickness at the first surface+salt thickness at the second surface of the plate-like glass article) is 50 μm for the left reflection image (A), 65 μm for the reflection image in the middle (B) and 80 μm for the right reflection image (C). The total sum was measured before cleaning the toughened glass article. Reflection image A shows no OOS while reflection image C has an OOS. Thus, increasing thickness of salt residue sticking to the glass surfaces after chemically toughening promotes the generation of OOS.

Figure 16:
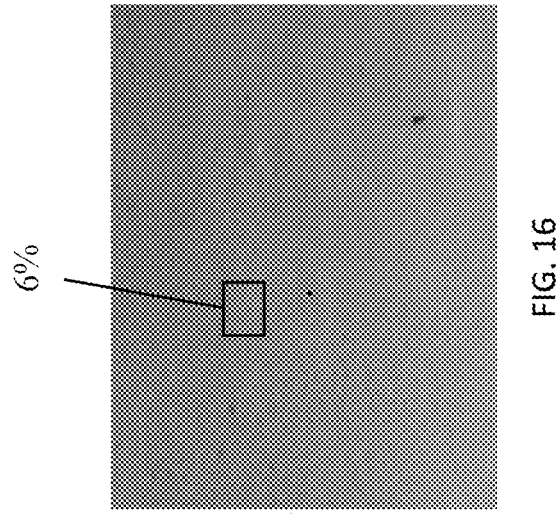
FIG. 16 shows a reflection image of a glass article having undergone a dwelling treatment at higher temperatures after lifting from the toughening salt bath ($KNO_3$).

FIG. 16 shows a reflection image of a 30 μm thick AS-glass article having undergone a dwelling treatment at higher temperatures after lifting from the toughening salt bath ($KNO_3$). The toughening temperature was about 420° C., the dwelling temperature was about 380° C., the dwelling time was about 12 min. No OOS can be seen on the toughened glass article. The inventors have found that it is possible to produce OOS free toughened glass articles from a salt bath that has been used for a very long time (i.e. which contains a high content of impurities due to ion-exchange) when the toughening procedure comprises a post-toughening dwelling step. In addition, the inventors have found that for 30 μm thick AS-glass articles dwelling times in the range of 2 to 5 min can be sufficient and are advantageous. A toughened glass article without OOS corresponding to that article shown in FIG. 16 can be produced with the same dwelling conditions (toughening temperature about 420° C., dwelling temperature about 380° C.) but with a dwelling time of about 3 min.

The experiments and evaluations explained above have been performed on AS glass type samples. However, it is clear that the observations and results can also be transferred to other glass types (for example lithium aluminosilicate glass, soda lime glass, borosilicate glass etc. Also see table 1).

The grey level variation, defined as StdDev/Mean×100%, was determined as a measure of the degree of OOS for the samples of FIGS. 1 to 16 using "ImageJ 1.52d" and the evaluation method described above. The determined values are given in the respective figures. In each case the squares indicate the region of interest on the sample in a schematic way, they schematically point out the location of the measured degree of OOS. However, the size of the individual square does not prescribe the exact size of the area examined and measured by ImageJ and is not correlated thereto.

Small grey level variations, particularly up to 9%, indicate no OOS or no significant OOS. Higher grey level variations indicate visible OOS.

For example, FIG. 1b, 3b, 9c, 10c show toughened glass articles having a quite high degree of OOS. The toughened glass articles shown in FIG. 4b, 5b have a low homogeneity concerning the degree of OOS. FIG. 6, 8a, 13b, 13c, 16 are examples for toughened glass articles having no OOS or no significant OOS and having a quite high homogeneity concerning the degree of OOS.

TABLE 1

Glass compositions

| Composition (wt %) | Glass Type 1 | Glass Type 2 | Glass Type 3 | Glass Type 4 | Glass Type 5 | Glass Type 6 | Glass Type 7 | Glass Type 8 |
|---|---|---|---|---|---|---|---|---|
| $SiO_2$ | 61 | 53 | 62 | 61.5 | 61 | 65 | 70 | 80 |
| $Al_2O_3$ | 17 | 23 | 17.5 | 17.5 | 18 | 4 | — | 3 |
| $Li_2O$ | — | — | — | — | 5 | — | — | — |
| $Na_2O$ | 12 | 11 | 15 | 14.2 | 10 | 6 | 9.5 | 5 |
| $K_2O$ | 4 | 5 | 2 | 2 | | 7 | 8 | — |
| MgO | 4 | 2 | 2.5 | 2.5 | | | | |
| CaO | — | — | — | — | 1 | — | 6 | — |
| BaO | — | — | — | — | | — | 2.5 | — |
| ZnO | — | — | — | 1 | — | 6 | 4 | — |
| $ZrO_2$ | 2 | — | 1 | 1.3 | 4 | — | — | — |
| $B_2O_3$ | — | 6 | | | 1 | 8 | — | 12 |
| $TiO_2$ | — | — | | | — | 4 | — | — |

What is claimed is:

1. A method for chemical toughening an ultrathin glass article without resultant Optical Orange Skin (OOS), comprising:
    providing the ultrathin glass article that has a thickness of at most 0.07 mm;
    immersing the ultrathin glass article into a bath of molten salt having a toughening temperature for a toughening time to form an ultrathin toughened glass article;
    lifting the ultrathin toughened glass article out of the bath of molten salt while preventing sections of the ultrathin toughened glass article emerging from the bath of molten salt from cooling below a set dwelling temperature that is higher than or equal to the toughening temperature and lower than a transition temperature (Tg) of the ultrathin toughened glass article and so a uniform layer of residual salt forms on a surface of the ultrathin toughened glass article;
    dwelling the ultrathin toughened glass article with the uniform layer of residual salt for a dwelling time in a range of 2 minutes to 12 minutes at the set dwelling temperature;
    selecting parameters so that a thickness of the uniform layer of residual salt attached to the surface of the ultrathin toughened glass article from the immersing is less than 9/10*t, wherein t is the thickness of the ultrathin glass article; and
    cooling and cleaning the ultrathin toughened glass article to remove the uniform layer of residual salt wherein the immersing, lifting, and dwelling cause the ultrathin toughened glass article to have a surface compressive stress greater than 300 MPa without OOS.

2. The method of claim 1, wherein the step of lifting of the ultrathin toughened glass article is performed with a lifting speed that is less than 1 m/min and greater than 0.001 m/min.

3. The method of claim 1, wherein the step of lifting of the ultrathin toughened glass article is performed with a lifting speed that is less than 0.5m/min and greater than 0.05m/min.

4. The method of claim 1, wherein the set dwelling temperature and the toughening temperature have a difference that is less than 55° C.

5. The method of claim 1, wherein the dwelling time is in a range of 2 minutes to less than 10 minutes.

6. The method of claim 1, wherein the dwelling time is in a range of 2 minutes to 5 minutes.

7. The method of claim 1, wherein the step of selecting parameters comprises selecting parameters selected from a group consisting of the toughening temperature, the toughening time, a lifting speed, the dwelling time, the set dwelling temperature, and any combinations thereof.

8. The method of claim 1, further comprising selecting parameters so that a total thickness variation of salt residue attached to the surface of the ultrathin toughened glass article from the immersing the ultrathin glass article into the bath of molten salt is less than 9/10*t, wherein t is the thickness of the ultrathin glass article.

9. The method of claim 1, wherein the bath of molten salt has a content of impurities that is less than 5000 ppm, wherein the impurities are exchanged ions originating from a glass composition of the ultrathin glass article.

10. The method of claim 1, wherein the bath of molten salt has a content of impurities that is less than 20 ppm, wherein the impurities are exchanged ions originating from a glass composition of the ultrathin glass article.

11. The method of claim 1, wherein the ultrathin glass article is an alkali metal aluminosilicate glass comprising the following components in the indicated amounts (in wt. %):

| Component | (wt. %) |
| --- | --- |
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10. |

12. The method of claim 1, wherein the thickness of the uniform layer of residual salt is a thickness at a location outside an edge region of the ultrathin toughened glass article.

13. A method for chemical toughening an ultrathin glass article, comprising:
providing the ultrathin glass article that has a thickness of at most 0.07 mm;
immersing the ultrathin glass article into a bath of molten salt having a toughening temperature for a toughening time to form an ultrathin toughened glass article;
lifting the ultrathin toughened glass article out of the bath of molten salt with a controlled lifting speed of less than 0.5 m/minute so that salt residues flow off a surface of the ultrathin toughened glass article under an influence of gravity and surface tension between the bath of molten salt and the ultrathin glass article to form a uniform layer of residual salt on the surface of the ultrathin toughened glass article;
selecting parameters so that a thickness of the uniform layer of residual salt attached to the surface of the ultrathin toughened glass article from the immersing is less than 9/10*t, wherein t is the thickness of the ultrathin glass article; and
cooling and cleaning the ultrathin toughened glass article to remove the uniform layer of residual salt, wherein the immersing and lifting cause the ultrathin toughened glass article to have a surface compressive stress greater than 300 MPa without Optical Orange Skin.

14. The method of claim 13, wherein the step of selecting parameters comprises selecting parameters selected from a group consisting of the toughening temperature, the toughening time, the lifting speed, and any combinations thereof.

15. The method of claim 13, wherein the thickness of the uniform layer of residual salt is a thickness at a location outside an edge region of the ultrathin toughened glass article.

16. A method for chemical toughening an ultrathin glass article without resultant Optical Orange Skin (OOS), comprising:
providing the ultrathin glass article that has a thickness of at most 0.07 mm;
immersing the ultrathin glass article into a bath of molten salt having a toughening temperature for a toughening time to form an ultrathin toughened glass article;
controlling a content of exchange ion impurities that originate from the ultrathin glass article in the bath of molten salt to be less than 5000 ppm with a selective absorber;
lifting the ultrathin toughened glass article out of the bath of molten salt;
selecting parameters so that a thickness of a residual salt layer attached to a surface of the ultrathin toughened glass article from the immersing is less than 9/10*t, wherein t is the thickness of the ultrathin glass article; and
cooling and cleaning the ultrathin toughened glass article, wherein the immersing, controlling and lifting cause the ultrathin toughened glass article to have a surface compressive stress greater than 300 MPa without OOS.

17. The method of claim 16, wherein the ultrathin glass article is an alkali metal aluminosilicate glass comprising the following components in the indicated amounts (in wt. %):

| Component | (wt. %) |
| --- | --- |
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10. |

18. The method of claim 16, wherein the step of selecting parameters comprises selecting parameters selected from a group consisting of the toughening temperature, the toughening time, a lifting speed, and any combinations thereof.

19. The method of claim 16, wherein the thickness of the residual salt layer is a thickness at a location outside an edge region of the ultrathin toughened glass article.

20. A method for chemical toughening an ultrathin glass article without Optical Orange Skin (OOS), comprising:
providing the ultrathin glass article that has a thickness of at most 0.07 mm;
immersing the ultrathin glass article into a bath of molten salt having a toughening temperature for a toughening time to form an ultrathin toughened glass article;
lifting the ultrathin toughened glass article out of the bath of molten salt so that there is a residual salt layer coating a surface of the ultrathin toughened glass article;
dwelling the ultrathin toughened glass article with the residual salt layer for a dwelling time at a dwelling temperature that is higher than a melting point of the bath of molten salt and lower than a transition temperature (Tg) of the ultrathin toughened glass article, wherein the dwelling temperature is higher than the toughening temperature;

selecting parameters so that a thickness of the residual salt layer attached to the surface of the ultrathin toughened glass article from the immersing is less than 9/10*t, wherein t is the thickness of the ultrathin glass article; and cooling and cleaning the ultrathin toughened glass article to remove the residual salt layer, wherein the immersing, lifting, and dwelling cause the ultrathin toughened glass article to have a surface compressive stress greater than 300 MPa without OOS.

21. The method of claim 20, wherein the dwelling temperature and the toughening temperature have a difference that is <55° C.

22. The method of claim 20, wherein the step of selecting parameters comprises selecting parameters selected from a group consisting of the toughening temperature, the toughening time, a lifting speed, the dwelling time, the dwelling temperature, and any combinations thereof.

23. The method of claim 20, wherein the thickness of the residual salt layer is a thickness at a location outside an edge region of the ultrathin toughened glass article.

24. A method for chemical toughening an ultrathin glass article without Optical Orange Skin (OOS), comprising:
providing the ultrathin glass article that has a thickness of at most 0.07 mm;
immersing the ultrathin glass article into a bath of molten salt having a toughening temperature for a toughening time to form an ultrathin toughened glass article;
lifting the ultrathin toughened glass article out of the bath of molten salt into a dwelling space directly above the bath of molten salt and so that there is a residual salt layer on a surface of the ultrathin toughened glass article;
controlling a temperature of the dwelling space to be at a set dwelling temperature, the set dwelling temperature being higher than the toughening temperature;
selecting parameters so that a thickness of the residual salt layer attached to the surface of the ultrathin toughened glass article from the immersing is less than 9/10*t, wherein t is the thickness of the ultrathin glass article; and
dwelling the ultrathin toughened glass article with the residual salt layer in the dwelling space for a dwelling time at the set dwelling temperature; and
cooling and cleaning the ultrathin toughened glass article to remove the residual salt layer, wherein the immersing, lifting, controlling and dwelling cause the ultrathin toughened glass article to have a surface compressive stress greater than 300 MPa without OOS.

25. The method of claim 24, wherein the step of selecting parameters comprises selecting parameters selected from a group consisting of the toughening temperature, the toughening time, a lifting speed, the dwelling time, the set dwelling temperature, and any combinations thereof.

26. The method of claim 24, wherein the thickness of the residual salt layer is a thickness at a location outside an edge region of the ultrathin toughened glass article.

27. A method for chemical toughening an ultrathin glass article without avoiding Optical Orange Skin (OOS), comprising:
providing the ultrathin glass article with a thickness of at most 0.07 mm;
immersing the ultrathin glass article into a bath of molten salt having a toughening temperature for a toughening time to form an ultrathin toughened glass article;
lifting the ultrathin toughened glass article out of the bath of molten salt into a dwelling space directly above the bath of molten salt and so that there is a residual salt layer coating a surface of the ultrathin toughened glass article;
controlling a temperature of the dwelling space to be at a constant dwelling temperature, the constant dwelling temperature being less than 70 degrees higher or lower than the toughening temperature; and
dwelling the ultrathin toughened glass article with the residual salt layer in the dwelling space for a dwelling time of at least 2 minutes at the constant dwelling temperature;
selecting parameters so that a thickness of the residual salt layer attached to the surface of the ultrathin toughened glass article from the immersing is less than 9/10*t, wherein t is the thickness of the ultrathin glass article; and
cooling and cleaning the ultrathin toughened glass article to remove the residual salt layer, wherein the immersing, lifting, controlling and dwelling cause the ultrathin toughened glass article to have a surface compressive stress greater than 300 MPa without OOS.

28. The method of claim 27, wherein the step of selecting parameters comprises selecting parameters selected from a group consisting of the toughening temperature, the toughening time, a lifting speed, the dwelling time, the constant dwelling temperature, and any combinations thereof.

29. The method of claim 27, wherein the thickness of the residual salt layer is a thickness at a location outside an edge region of the ultrathin toughened glass article.

* * * * *